United States Patent
Arnoult, Jr. et al.

(10) Patent No.: US 7,746,225 B1
(45) Date of Patent: Jun. 29, 2010

(54) METHOD AND SYSTEM FOR CONDUCTING NEAR-FIELD SOURCE LOCALIZATION

(75) Inventors: Kenneth M. Arnoult, Jr., Fairbanks, AK (US); Curt A. L. Szuberla, Fairbanks, AK (US); John V. Olson, Fairbanks, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 1246 days.

(21) Appl. No.: 11/291,497

(22) Filed: Nov. 30, 2005

Related U.S. Application Data

(60) Provisional application No. 60/632,004, filed on Nov. 30, 2004.

(51) Int. Cl.
| | |
|---|---|
| G08B 1/08 | (2006.01) |
| G08B 5/22 | (2006.01) |
| G01S 3/80 | (2006.01) |
| H04B 1/06 | (2006.01) |
| H03D 1/04 | (2006.01) |

(52) U.S. Cl. ............... 340/539.13; 340/825.49; 367/127; 367/135; 367/136; 342/107; 342/108; 342/195; 342/89; 342/175; 375/346

(58) Field of Classification Search ............... None
See application file for complete search history.

(56) References Cited

U.S. PATENT DOCUMENTS

| | | | |
|---|---|---|---|
| 5,625,348 A | 4/1997 | Farnsworth et al. | |
| 5,629,707 A * | 5/1997 | Heuvel et al. | 342/357.16 |
| 6,178,141 B1 | 1/2001 | Duckworth et al. | |
| 6,560,536 B1 * | 5/2003 | Sullivan et al. | 701/214 |
| 6,570,500 B1 | 5/2003 | Pieper | |
| 6,792,118 B2 | 9/2004 | Watts | |
| 2002/0172307 A1 | 11/2002 | Sandberg | |
| 2003/0033094 A1 | 2/2003 | Huang | |
| 2004/0085241 A1 | 5/2004 | Arikan et al. | |
| 2004/0216016 A1 * | 10/2004 | Olaker | 714/709 |
| 2005/0060142 A1 | 3/2005 | Visser et al. | |

(Continued)

OTHER PUBLICATIONS

Sound Source Separation and Localization. Honors Thesis in Computer Science Biniyam Tesfaye Taddese. May 1, 2006. Macalester College St. Paul, Minnesota.*

(Continued)

*Primary Examiner*—Daniel Wu
*Assistant Examiner*—Fekadeselassie Girma
(74) *Attorney, Agent, or Firm*—Ballard Spahr LLP

(57) ABSTRACT

Disclosed herein is a fast method that locates nearby sources based solely on the time-of-flight of a signal across an array of sensors. The time delay for signal passage between all pairs of sensors is determined using cross-correlation estimates and a vector of time delays, $\tau$, is constructed from the results. In the noise free case, each point in the plane is associated with a unique value of the $\tau$ vector. The plane is searched for a source location by minimizing the difference between the value of $\tau$ associated with the candidate location on the plane and the value estimated from cross-correlations. The search takes place over the three dimensional space that includes two coordinates in the plane and the propagation speed. The starting point for the search is constructed from an analytic fit of circular wave fronts to groups of sensors within the array.

16 Claims, 8 Drawing Sheets

U.S. PATENT DOCUMENTS

2005/0089124 A1    4/2005    Valle
2008/0134232 A1*   6/2008    Rhoads .................... 725/28
2009/0097702 A1*   4/2009    Rhoads .................... 382/100

OTHER PUBLICATIONS

Porting AODV-UU Implementation to ns-2; and Enabling Trace-based Simulation; Dec. 18, 2002; Information Technology Department of Computer Systems; Uppsala University.*

Gold Nanoparticles as Fine Tuners of Electrochemical; Properties of the Electrode/Solution Interface; Sep. 11, 2002; State Key Laboratory of Electroanalytical Chemistry, Changchun Institute of Applied Chemistry, Chinese Academy of Sciences, Changchun, Jilin 130022, People's Republic of China.*

Weighting of constraints in Fuzzy Optimization U.Kaymak; IEEE 2001; Faculity of Economics Dep. of computer science; Erasmus University Rotterdam, the Netherlands.*

Seeding Techniques and Scaffolding Choice for Tissue; Engineering of the Temporomandibular Joint Disk Alejandro J. Almarza, B.S., and Kyriacos A. Athanasiou, Ph.D., P.E.; Tissue Engineering vol. 10, No. 11/12, 2004; © Mary Ann Liebert, Inc.*

Fiber Bragg grating sensor demodulation technique by synthesis of grating parameters from its reflection spectrum Christophe Caucheteur *,1, Fre'de'ric Lhomme' 2, Karima Chah 2; Michel Blondel, Patrice Me'gret 3 Faculte Polytechnique de Mons, Electromagnetism and Telecommunication Unit, Boulevard Dolez 31, B-7000 Mons, Belgium Received Apr. 9, 2004.*

Smith, et al.; "Closed-Form Least-Squares Source Location Estimation from Range-Difference Measurements"; IEEE Transactions on Acoustics, Speech, and Signal Processing: vol. ASSP-35; No. 12; Dec. 1987; pp. 1661-1669.

Chen, et al.; "Maximum-Likelihood Source Localization and Unknown Sensor Location Estimation for Wideband Signals in the Near-Field"; IEEE Transactions on Signal Processing; vol. 50; No. 8; Aug. 2002; pp. 1843-1854.

Grosicki, et al.; "A Weighted Linear Prediction Method for Near-Field Source Localization"; IEEE International Conference on Acoustics, Speech, and Signal Processing; May 13-17, 2002; pp. 2957-2960.

Hu, et al.; "Eigen-structure Based Near-Field Wideband Sources Localization"; Acoust. Sci. & Tech.; vol. 23; No. 5; 2002; pp. 267-274.

Kabaoglu, et al.; "Maximum Likelihood 3-D Near-Field Source Localization Using the EM Algorithm"; Proceedings of the Eighth IEEE International Symposium on Computers and Communication; 2003; pp. 1-6.

Schau, et al.; "Passive Source Localization Employing Intersecting Spherical Surfaces from Time-of-Arrival Difference"; IEEE Transactions on Acoustics Speech, and Signal Processing; vol. ASSP-35; No. 8, Aug. 1987; pp. 1223-1225.

Kozick, et al.; "Near-Field Localization of Acoustic Sources with Imperfect Spatial Coherence, Distributed Processing, and Low Communication Bandwidth"; Proceedings of SPIE; vol. 4393; 2001; pp. 52-63.

Cavaco, et al.; "A Biologically Plausible Acoustic Azimuth Estimation System"; Proceedings of the Workshop on Computational Auditory Scene Analysis (CASA 99) of the International Joint Conference on Artificial Intelligence (IJCAI 99); Aug. 1999; pp. 78-86.

Obata, et al.; "A New Sound Source Location Algorithm Based on Formant Frequency for Sound Image Localization"; International Conference on Multimedia and Expo; IEEE; 2003; pp. 729-732.

Lee, et al.; "An Extended Zero-crossing Method for Ultrasonic Velocity Measurements"; Journal of the Acoustical Society of Japan (E); vol. 16; No. 6; Nov. 1995; 1 page.

Huang et al.; "Sound Localization of Concurrent and Continuous Speech Sources in Reverberant Environment"; IEEE ASSP Workshop on Applications of Signal Processing to Audio and Acoustics; Oct. 19-22, 1997; pp. 1-4.

Venezia, et al.; "Test and Evaluation of a Midwater Three Dimensional Underwater Tracking Array"; Engineering in Harmony with the Ocean Proceedings vol. II; 1993; pp. 490-493.

Vestrheim, et al.; "Transit Time Determination in a Measurement System, With Effects of Transducers"; IEEE Ultrasonics Symposium; Nov. 3-6, 1996; pp. 665-668.

U.S. Appl. No. 11/832,051, filed Aug. 1, 2007, Arnoult, Jr., et al.

* cited by examiner

METHOD AND SYSTEM FOR CONDUCTING NEAR-FIELD SOURCE LOCALIZATION

CROSS REFERENCE TO RELATED PATENT APPLICATIONS

This application claims priority to U.S. Provisional Application No. 60/632,004 filed Nov. 30, 2004, herein incorporated by reference in its entirety.

BACKGROUND OF THE INVENTION

Using a passive sensor array to determine the position of a signal source is a task that has long challenged researchers in many different fields of study. For this reason, there has also been a wealth of proposed solutions presented in the literature. However, due to the complexity of the problem, many of these techniques are only designed for application with sensor arrays of specific, highly symmetrical geometries.

In contrast to seismic sources, infrasonic sources can often be located near or even within the perimeter of the array. Additionally, their signals can often be damped by terrain or vegetation, making range estimation via signal amplitude inaccurate. For this reason, a time-delay based method was constructed in order to locate nearby sources of infrasound with arrays of any configuration. Even though this method was originally designed for use with infrasound, it can be applied equally well to any type of signal which can be detected by an array of sensors via an isotropic medium.

SUMMARY OF THE INVENTION

Disclosed are systems, methods, and computer readable media for determining a source location. The systems, methods, and computer readable media can determine, for each sensor in a sensor array, times of source signal arrivals relative to each sensor. An analytical seed method can be applied to the relative source signal arrival times. The analytical seed method can comprise redefining a location and a signal arrival time of a sensor as a new origin, determining signal speed, and determining a source location and source time. The analytical seed method can adjust for constant known uniform motion of a medium and for constant unknown uniform motion of a medium.

A simplex can be built from the results of the analytical seed method and a location determined using an optimization procedure. The optimization procedure can be a Nelder-Mead optimization.

Data can be used as it is generated by an array of sensors, or data can be used that was previously generated by an array of sensors. The sensor array can receive infrasound signals. The signal source can be far from the array, near the array or within the array.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Figure 1:
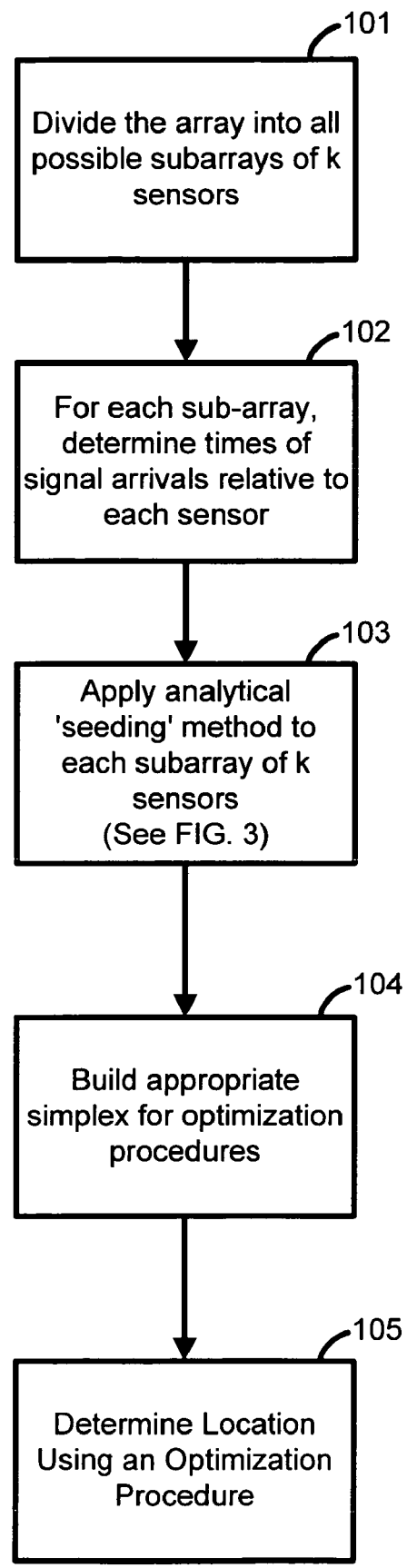
FIG. 1 is a flow diagram illustrating exemplary steps in an implementation of the disclosed method.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments of the invention and the Examples included therein and to the Figures and their previous and following description.

The methods disclosed can be used for analysis of near-field sources. The method can be used in high signal-to-noise ratio (S/N) cases in conjunction with either 2-D (two spatial dimensions, planar) or 3-D (three spatial dimensions) sensor arrays. The method places no restrictions on array geometry or source location. The method can determine approximate locations of near-field sources, even if the sources are located near or within the perimeter of the array. For sources in the far-field, where range estimates are limited by the array's diameter, this method can provide valid azimuth and signal trace speed estimations. This method can utilize time delays between signal arrivals at individual sensors instead of utilizing measured signal amplitudes. This in turn adds robustness and eases some of the operational constraints placed on the sensors.

I. General Method

The method disclosed is based on several broad assumptions that greatly reduce mathematical complexity and computational time. It is assumed that at any given time, there is only one signal source. However, if multiple narrowband sources are present in the same time interval, they can be analyzed individually by simply separating the signals and analyzing each in turn. Each source is assumed to be a stationary point source. It is also assumed that signals arrive at each sensor along direct "line of sight" paths from the source and that the signal medium is isotropic. Lastly, it is assumed that the segment of data containing the signal has a high signal to noise ratio (S/N).

The localization method described herein can rely solely on time delays rather than signal amplitude information or a particular signal model assumption. Additionally, for a properly designed array, the method has no difficulty in locating sources within the array. For best results, the array should be designed in order to break certain symmetries which give rise to image sources. Since a functional search algorithm in multi-dimensions can only guarantee a local minimum, it is important to eliminate the possibility that a source external to the array can give rise to an image solution within the array (or visa-versa). Single, regular polygonal arrays are particularly prone to this degeneracy.

FIG. 1 illustrates exemplary steps in a method for locating a signal source using an array of 4 sensors. The method can receive as input, geographic coordinates of sensor locations, where n is the number of sensors. The geographic coordinates can be in a matrix organized as a row of column vectors containing the easting and northing of each sensor relative to some origin. Another input can be the column vector of time delays, given by Eq. 1 below.

The method begins by dividing the array of n sensors into all possible sub-arrays of k sensors at block 101. Then the method determines the time delays between the signal's arrival at all non-redundant pairs of sensors within each sub-array at 102. The time delay between the signal's arrival at any 2 sensors i and j ($\Delta t_{ij}$) are measured directly by using standard cross-correlation estimates on the data recorded by those 2 sensors. This process is repeated for all non-redundant pairs of sensors in the array and the results are recorded in a column vector, $\tau$, given by the following equation:

$$\tau = [\Delta t_{12} \Delta t_{13} \ldots \Delta t_{(1)(n)} \Delta t_{23} \ldots \Delta t_{(2)(n)} \ldots \Delta t_{34} \ldots \Delta t_{(n-1)(n)}]^T \quad (1)$$

where $X^T$ represents the transpose of the vector X. Note that for an n-element array the dimension of the vector is $[n(n-1)/2, 1]$ and that the pair-wise time delays are measured directly without having measured absolute times of arrival.

Figure 2:
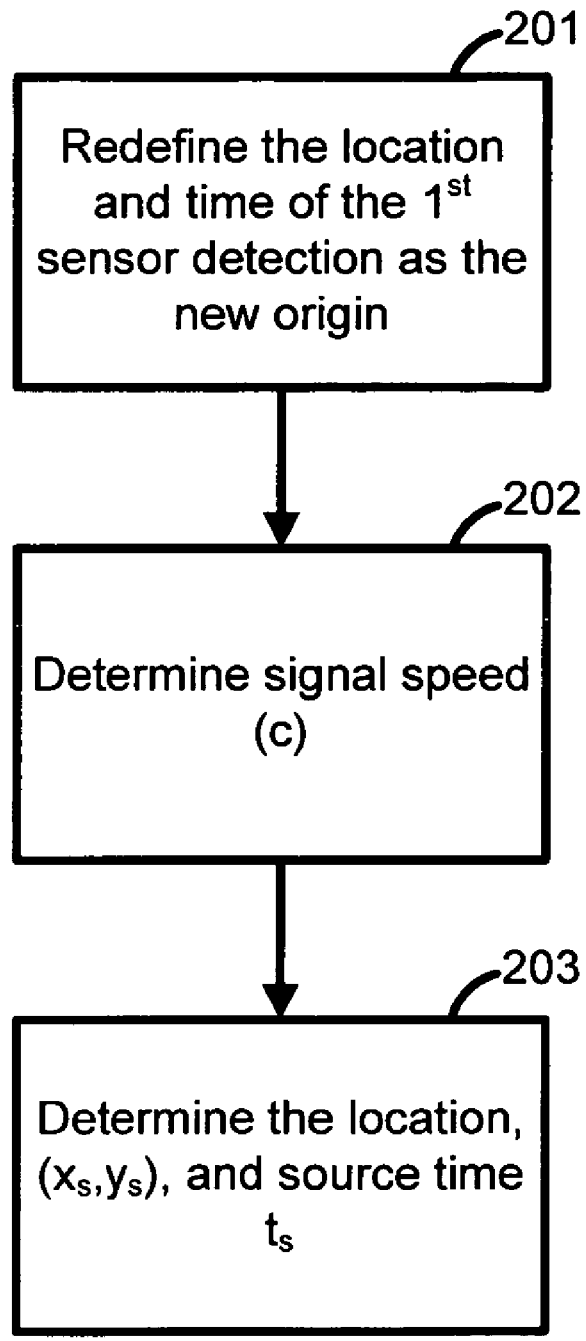
FIG. 2 is a flow diagram illustrating exemplary steps in a portion of an implementation of the disclosed method.

Then the method applies an analytical 'seeding' method at block 103, described in further detail below and in FIG. 2. The purpose of the seeding method is to provide a starting point, or seed, from which an optimization procedure can later be launched. However, since the seeding method is analytical, it can only be applied to a very specific number of sensors, k. For example, k can be 4. Therefore, the seeding method is applied to every combination of k sensors within the original n-sensor array. The number of combinations containing k sensors that can be constructed from n sensors is $$\frac{n!}{k!(n-k)!}.$$

The value of k will depend on the characteristics of the array and the medium; this topic will be discussed later in further detail.

Estimations of source location are determined for all possible k-sensor groups within an array of n sensors. Since the time delays of Eq. 1 are each measured quantities, for any given group of k sensors, there will be k unique realizations of the seeding method locations, by taking, in turn, each of the k sensors to be the reference sensor of the group. Each of the seeding method solutions can be calculated using straightforward linear algebraic techniques, culminating in the solution of either a cubic or quartic equation in the trace speed squared. There exists the possibility of having as many as three real solutions to the cubic equation and four real solutions to the quartic equation. In the case that there is no noise present, at least one location solution from all solution sets will be identical. However, in practice noise is ubiquitous, so for an array of n sensors, there can be as many as $$3\left(\frac{n!}{(k-1)!(n-k)!}\right)$$

solutions from the variants of the seeding methods that solve a cubic equation and $$4\left(\frac{n!}{(k-1)!(n-k)!}\right)$$

solutions from the variants that solve a quartic solution. For certain groups of k sensors, only a single real solution can be found among the three-fold or four-fold roots. These solutions from the sub-arrays can be used to initiate an optimization procedure which estimates a solution from all sensors in the array.

The Nelder-Mead optimization procedure is practical for this purpose due to its independence of derivatives of merit functions (the functions for which maximum values are being sought). However, Powell's method can also be used. Conjugate- or variable-metric gradient methods depend on derivatives of the merit function and are not as convenient for this application.

At block 104, using a kernel density technique, the probability functions of the range, azimuth and trace speed can be estimated for an ensemble of single-solution results of the analytical seeding method. From each of these probability functions, their full-width half-maximum and median values can be estimated and used to construct a set of vertices for a seed simplex appropriate for the parameter space. For example, in the case of a 2-D array with static medium, the seed simplex derived from these quantities can be an irregular tetrahedron in $(r, \theta, c)$ space. Its base can be given by the triangle with vertices: $(r_{low}, \theta_{med}, c_{low})$, $(r_{high}, \theta_{low}, c_{low})$, $(r_{high}, \theta_{high}, c_{low})$; and its apex is given by $(r_{med}, \theta_{med}, c_{med})$ Once the seed simplex derived from the analytical seed method is determined, the method can determine a localization by using an optimization procedure at block 105. The optimization procedure can be, for example, a Nelder-Mead minimization. By way of example, and not limitation, the method can perform a Nelder-Mead minimization on the "distance" $\delta\tau$ in a $[n(n-1)/2]$-dimensional space between the observed delay vector (Eq. 1) and a calculated delay vector, under model assumptions, arising from each of the vertices of the simplex. Since the mathematics of the Nelder-Mead method are more efficiently carried out in Cartesian space, each of the simplex vertices is first converted to Cartesian space.

The distance between two d-dimensional vectors a and b is generally defined according to the relation $$L_N = \left( \sum_{i=1}^{d} (a_i - b_i)^N \right)^{\frac{1}{N}}. \quad (2)$$

Typically, distance is defined according to the L2 norm, or the Euclidean distance. The minimization carried out by the method can use the L1 and L∞ norms. The L1 norm modifies the definition of Eq. 2 slightly $$L_1 = \left| \sum_{i=1}^{d} (a_i - b_i) \right|. \quad (3)$$

L1 can be used as a norm as it is less sensitive to outliers than the traditional L2 norm. Via Eq. 2 it can be seen that the L∞ norm replaces the sum by the maximum difference between any coordinate pairs in the vectors a and b. This technique is used because it is extremely computationally efficient and tends to give approximately normally distributed results for source localizations.

Each of the L1 and L∞ norm realizations of $\delta\tau$ is represented by a simplex that has contracted around some local minimum in Cartesian space representing a localization which gives a delay vector that is within some tolerance of the observed delay vector.

The output of the method can be three-fold: the 2 resulting simplexes from the L1 norm and L∞ norm based minimizations $\delta\tau$ Or and the mean localization derived from the results of the seeding method. From among these an operator can decide which is a valid localization, or can use the results in concert to decide whether or not a realistic localization has been achieved.

It is important to emphasize that even though a search is conducted for locations in space and for signal trace speeds, this is not a grid search over a predetermined set of points. The minimization algorithm can be based upon a Nelder-Mead technique and can utilize a simplex of points which expands, contracts, and reflects through the space spanned by source location ([x, y] or [x, y, z]), signal trace speed (c), and, if needed, velocity of medium drift ($[w_x, w_y]$ or $[w_x, w_y, w_z]$) until the point that minimizes $\delta\tau$ is found to within a specified tolerance. The method can find a minimum in $\delta\tau$ within a tolerance of $10^{-10}$ in 1 to 2 seconds for an array of 10 sensors or less. Once a location is determined, range and azimuth are calculated relative to the origin of the array coordinate system (although these results can be transformed into any coordinates desired).

A Monte Carlo approach can be used to estimate the uncertainties inherent in any source localization that uses an arbitrary array. In this approach, a synthetic data set is generated that simulates the sensor records, across the array, for a signal that was generated from a known source location. These synthetic signals may be calculated directly from time-of-flight considerations from the source to each sensor. For a given synthetic signal, an ensemble of like signals is generated by corrupting the calculated signal with random noise.

A source localization is performed for each data set in the ensemble. A statistical analysis of the resulting ensemble of localizations provides an estimate of the uncertainty in the locator method. By varying the noise amplitude and characteristics, these uncertainties can be expressed as functions of those parameters. The locator method is insensitive to the actual synthetic signal characteristics (e.g., impulsive or periodic).

II. Analytical 'Seeding' Method

The analytical seeding method is currently able to be applied to six cases: (i) a planar (2-D) array with a static medium, (ii) a planar (2-D) array with a medium drifting at an unknown, constant velocity, (iii) a planar (2-D) array with a medium drifting at a known constant velocity, (iv) a spatial (3-D) array with a static medium, (v) a spatial (3-D) array with a medium drifting at an unknown, constant velocity, and (vi) a spatial (3-D) array with a medium drifting at a known, constant velocity. For each case, a slightly different variant of the seeding method is used. However, each variant is derived from the same fundamental approach, but is constructed to be mathematically compatible with the above mentioned six cases.

Figure 3:
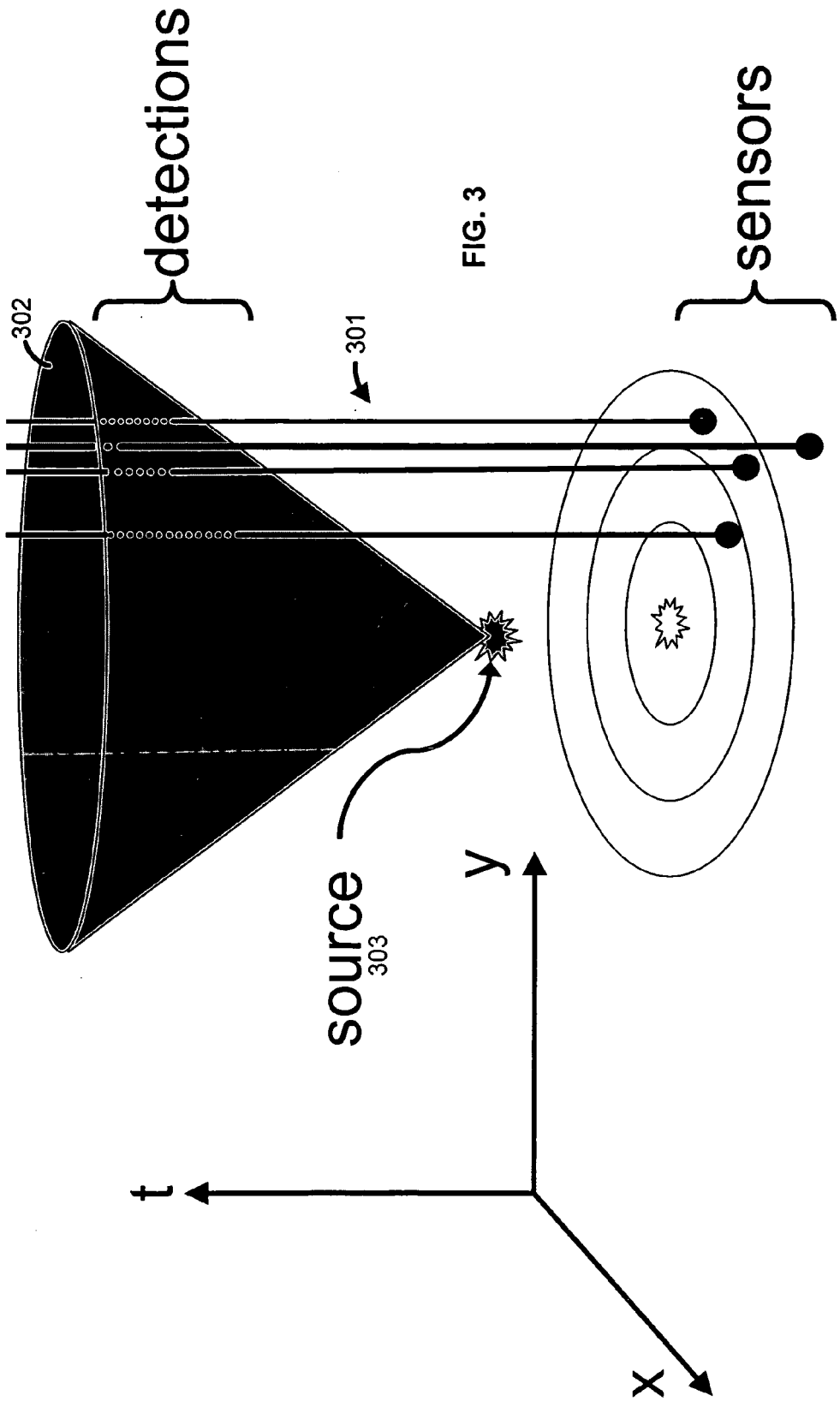
FIG. 3 is a space-time diagram depicting the detection of a signal by a planar array of 4 sensors. Detections occur where and when the vertical lines (sensors) intersect the cone (signal). The detections can then be used to solve the equation of the cone and thus locate the source of the signal. This is the fundamental approach of the analytical 'seeding' method as applied to a planar array in a static medium.

For the sake of clarity, the fundamental approach of the seeding method is discussed with regards to case (i) as portrayed in FIG. 3. FIG. 3 is a space-time diagram depicting the detection of a signal by a planar array of 4 sensors. In this case, with a planar array and static medium, the signal propagating from a point source has the shape of a right, circular cone when plotted in (x,y,t) space. Since the sensors are at fixed positions, they are plotted in (x,y,t) space as vertical lines parallel to the time axis. Detections occur where and when the vertical lines 301 (sensors) intersect the cone 302 (signal). The detections can then be used to solve the equation of the cone and thus locate the source 303 of the signal. This is an approach of the analytical 'seeding' method as applied to a planar array in a static medium. Since 4 points are necessary to determine a right, circular cone uniquely, this problem reduces to a simpler mathematical problem: given 4 points (detections), find the equation of the cone that passes through them. Once solved, the vertex of the cone gives the location of the source ($x_s$, $y_s$) and the time the signal was released ($t_s$); the slope of the cone gives the signal's trace speed (c). This solution obtained from 4 sensors of an array can then be used as a starting point, or 'seed', for an algorithm which searches the neighboring region for the solution that best matches the time delays between detections of all sensor pairs in the array. It should be noted that on occasion, more than one cone exists that can pass through 4 points. In these cases, information from other sensors in the array is needed to determine a unique solution.

The mathematical derivation of cases (i), (ii), and (iii), are presented below. From these 3 cases, cases (iv), (v), (vi) follow in a straight forward manner by introducing a new variable, z, which is treated identically to the variables x and y. To demonstrate this analogy, the derivation of case (iv) has also been provided.

i. Planar (2-D) Array & Static Medium

In general, the equation for a right, circular cone is:

$$(x-x_o)^2+(y-y_o)^2=\text{const.}\times(z-z_o)^2.$$

As applied to the current case, this equation can be written as $$(x-x_s)^2+(y-y_s)^2=c^2(t-t_s)^2 \quad (4)$$

where $x_s$, $y_s$, $t_s$, and $c$ represent the position of the source along the x-axis, the position of the source along the y-axis, the time that the signal was released, and the signal trace speed, respectively. The form of this equation can be expressed as:

$$x^2+y^2-(ct)^2+Ax+By+Cct+D=0, \quad (5)$$

where the values of A, B, C, and D are yet to be determined.

At block 201, the seeding method can introduce a new coordinate system (x', y',t') in which the origin lays at the point in space-time where the first sensor to detect the signal made its detection. In the case of simultaneous first detections, any of the sensors that detected the signal first can be chosen. For this example, it will be assumed that sensor 1 detected the signal at the same time or at an earlier time than all the other sensors in the array. The transformation is given by:

$$\begin{bmatrix} x' \\ y' \\ t' \end{bmatrix} \equiv \begin{bmatrix} x-x_1 \\ y-y_1 \\ t-t_1 \end{bmatrix}.$$

In the new coordinate system, Eq. 5 can be written as $$x'^2+y'^2-(ct')^2+A'x'+B'y'+C'ct'+D'=0$$

However, since $x'_1=y'_1=t'_1=0$, $D'=0$, the last term on the left side of Eq. 5 becomes zero.

$$x'^2+y'^2-(ct')^2+A'x'+B'y'+C'ct'=0 \quad (6)$$

In order to solve for the values of A', B', and C', apply Eq. 6 to sensors 2, 3, and 4.

$$x'^2_2+y'^2_2-(ct'_2)^2+A'x'_2+B'y'_2+C'ct'_2=0$$

$$x'^2_3+y'^2_3-(ct'_3)^2+A'x'_3+B'y'_3+C'ct'_3=0$$

$$x'^2_4+y'^2_4-(ct'_4)^2+A'x'_4+B'y'_4+C'ct'_4=0$$

These equations can also be written in matrix form.

$$\begin{bmatrix} x'_2 & y'_2 & ct'_2 \\ x'_3 & y'_3 & ct'_3 \\ x'_4 & y'_4 & ct'_4 \end{bmatrix} \times \begin{bmatrix} A' \\ B' \\ C' \end{bmatrix} = -\begin{bmatrix} x'^2_2+y'^2_2-(ct'_2)^2 \\ x'^2_3+y'^2_3-(ct'_3)^2 \\ x'^2_4+y'^2_4-(ct'_4)^2 \end{bmatrix}$$

The method first determines the values of A', B', and C' by solving the following series of equations via Cramer's Rule:

The results are given by:

$$A' = \frac{c^2 \det\begin{bmatrix} t'^2_2 & y'_2 & t'_2 \\ t'^2_3 & y'_3 & t'_3 \\ t'^2_4 & y'_4 & t'_4 \end{bmatrix} - \det\begin{bmatrix} x'^2_2+y'^2_2 & y'_2 & t'_2 \\ x'^2_3+y'^2_3 & y'_3 & t'_3 \\ x'^2_4+y'^2_4 & y'_4 & t'_4 \end{bmatrix}}{\det\begin{bmatrix} x'_2 & y'_2 & t'_2 \\ x'_3 & y'_3 & t'_3 \\ x'_4 & y'_4 & t'_4 \end{bmatrix}} \quad (7)$$

$$B' = \frac{c^2 \det\begin{bmatrix} x'_2 & t'^2_2 & t'_2 \\ x'_3 & t'^2_3 & t'_3 \\ x'_4 & t'^2_4 & t'_4 \end{bmatrix} - \det\begin{bmatrix} x'_2 & x'^2_2+y'^2_2 & t'_2 \\ x'_3 & x'^2_3+y'^2_3 & t'_3 \\ x'_4 & x'^2_4+y'^2_4 & t'_4 \end{bmatrix}}{\det\begin{bmatrix} x'_2 & y'_2 & t'_2 \\ x'_3 & y'_3 & t'_3 \\ x'_4 & y'_4 & t'_4 \end{bmatrix}} \quad (8)$$

$$C' = \frac{c^2 \det\begin{bmatrix} x'_2 & y'_2 & t'^2_2 \\ x'_3 & y'_3 & t'^2_3 \\ x'_4 & y'_4 & t'^2_4 \end{bmatrix} - \det\begin{bmatrix} x'_2 & y'_2 & x'^2_2+y'^2_2 \\ x'_3 & y'_3 & x'^2_3+y'^2_3 \\ x'_4 & y'_4 & x'^2_4+y'^2_4 \end{bmatrix}}{c \det\begin{bmatrix} x'_2 & y'_2 & t'_2 \\ x'_3 & y'_3 & t'_3 \\ x'_4 & y'_4 & t'_4 \end{bmatrix}}. \quad (9)$$

By completing the square, Eq. 6 can be placed into the same form as Eq. 4

$$\left(x'+\frac{A'}{2}\right)^2+\left(y'+\frac{B'}{2}\right)^2=\left(ct'-\frac{C'}{2}\right)^2-\frac{C'^2-A'^2-B'^2}{4}.$$

It is now clear that, $$\frac{A'}{2}=-x'_s \quad (10)$$

$$\frac{B'}{2}=-y'_s \quad (11)$$

$$\frac{C'}{2}=ct'_s \quad (12)$$

$$C'^2-A'^2-B'^2=0 \quad (13)$$

However, $C'^2-A'^2-B'^2$ must equal zero, since this term does not appear in Eq. 4. Substitution of A', B', and C' from Eqs. 7-9, yields an equation which is cubic with respect to $c^2$:

$$0=(\alpha^2+\beta^2)c^6-(2\alpha\gamma+2\beta\delta+\epsilon^2)c^4+(\gamma^2+\delta^2+2\epsilon\zeta)c^2-\zeta^2, \quad (14)$$

where $$\alpha = \det\begin{bmatrix} t_2'^2 & y_2' & t_2' \\ t_3'^2 & y_3' & t_3' \\ t_4'^2 & y_4' & t_4' \end{bmatrix} \quad \beta = \det\begin{bmatrix} t_2'^2 & x_2' & t_2' \\ t_3'^2 & x_3' & t_3' \\ t_4'^2 & x_4' & t_4' \end{bmatrix}$$

$$\gamma = \det\begin{bmatrix} x_2'^2 + y_2'^2 & y_2' & t_2' \\ x_3'^2 + y_3'^2 & y_3' & t_3' \\ x_4'^2 + y_4'^2 & y_4' & t_4' \end{bmatrix} \quad \delta = \det\begin{bmatrix} x_2'^2 + y_2'^2 & x_2' & t_2' \\ x_3'^2 + y_3'^2 & x_3' & t_3' \\ x_4'^2 + y_4'^2 & x_4' & t_4' \end{bmatrix}$$

$$\varepsilon = \det\begin{bmatrix} t_2'^2 & x_2' & y_2' \\ t_3'^2 & x_3' & y_3' \\ t_4'^2 & x_4' & y_4' \end{bmatrix} \quad \zeta = \det\begin{bmatrix} x_2'^2 + y_2'^2 & x_2' & y_2' \\ x_3'^2 + y_3'^2 & x_3' & y_3' \\ x_4'^2 + y_4'^2 & x_4' & y_4' \end{bmatrix}$$

At block 202, three or less unique, positive values of c can be calculated from Eq. 14. Of these, the physically plausible solutions for c are the ones that possess no imaginary component and result in a non-positive values of $t_s'$ (confirming the signal was emitted prior to or at the same time as the first detection) as derived by way of Eq. 12. From each value of c matching these criteria, corresponding values of $x_s'$ and $y_s'$ can be calculated by utilizing the relationships in Eqs. 10 and 11, respectively at block 203.

Finally, the solutions can be returned into the initial coordinate system by $$\begin{bmatrix} x_s \\ y_s \\ t_s \end{bmatrix} = \begin{bmatrix} x_s' + x_1 \\ y_s' + y_1 \\ t_s' + t_1 \end{bmatrix}$$

Since, 4 unknowns ($x_s$, $y_s$, $t_s$, c) are being solved for in this case, 4 sensors are required (k=4).

ii. Planar (2-D) Array & Medium Drifting at Unknown, Constant Velocity

Source locations can be calculated analytically for a 2D array of sensors even if the medium is "drifting" uniformly at a constant, but unknown velocity. For example, this technique could be applied to acoustic sensors on a windy day or hydroacoustic sensors in an ocean current. Constant drift of a medium causes the center of the circular wavefront of a signal to undergo translational motion, but does not distort the shape of the wavefront. Thus, the motion of the medium can be accounted for by incorporating linearly time-dependent "correctional" terms to the x and y positions of the source ($x_s$ and $y_s$, respectively).

$$(x - [x_s + w_x(t-t_s)])^2 + (y - [y_s + w_y(t-t_s)])^2 = c^2(t-t_s)^2 \tag{15}$$

Using Eq. 15, the medium's velocity components along the x and y axes ($w_x$ and $w_y$, respectively) can be calculated. However, solving for these 2 extra unknowns requires 2 more sensors than in the windless case, for a total of six sensors.

Expand equation (15) and collect like terms.

$$0 = -x^2 - y^2 + (c^2 - w_x^2 - w_y^2)t^2 + (2w_x)xt + (2w_y)yt + 2(x_s - w_x t_s)x + \tag{16}$$
$$2(y_s - w_y t_s)y + 2(w_x^2 t_s + w_y^2 t_s - c^2 t_s - x_s w_x - y_s w_y)t -$$
$$x_s^2 - y_s^2 + c^2 t_s^2 + 2x_s w_x t_s + 2y_s w_y t_s - w_x^2 t_s^2 - w_y^2 t_s^2$$

For convenience, define the following 3 terms and substitute back into Eq. 16:

$$v \equiv \sqrt{c^2 - w_x^2 - w_y^2} \tag{17}$$
$$\xi \equiv vt$$
$$\xi_s \equiv vt_s$$

$$0 = -x^2 - y^2 + \xi^2 + \left(\frac{2w_x}{v}\right)x\xi + \tag{18}$$
$$\left(\frac{2w_y}{v}\right)y\xi + 2\left(x_s - \frac{w_x\xi_s}{v}\right)x + 2\left(y_s - \frac{w_y\xi_s}{v}\right)y +$$
$$\left(\frac{2}{v}\right)(-v\xi_s - x_s w_x - y_s w_y)\xi - x_s^2 - y_s^2 + \xi_s^2 + \frac{2(x_s w_s + y_s w_y)}{v}\xi_s$$

In terms of x, y, and $\xi$, Eq. 18 has the following form:

$$0 = x^2 - y^2 + \xi^2 + Ax\xi + By\xi + Cx + Dy + E\xi + F \tag{19}$$

At block 201, it is convenient to introduce a new coordinate system (x', y', t') in which the origin lays at the point in space-time where the first sensor to detect the signal made its detection. In the case of simultaneous first detections, any of the sensors that detected the signal first can be chosen. For this example, it will be assumed that sensor 1 detected the signal at the same time or at an earlier time than all the other sensors in the array.

$$\begin{bmatrix} x' \\ y' \\ t' \end{bmatrix} \equiv \begin{bmatrix} x - x_1 \\ y - y_1 \\ t - t_1 \end{bmatrix}$$

Eq. 19 can be expressed in the new coordinate system as $$0 = x'^2 y'^2 + \xi'^2 + A'x'\xi' + B'y'\xi' + C'x' D'y' + E'\xi' + F' \tag{20}$$

where $$A' = \frac{2w_x}{v} \quad B' = \frac{2w_y}{v} \quad C' = 2\left(x_s' - \frac{w_x\xi_s'}{v}\right) \quad D' = 2\left(y_s' - \frac{w_y\xi_s'}{v}\right)$$

$$E' = \left(\frac{2}{v}\right)(-v\xi_s' - x_s'w_x - y_s'w_y) \quad F' = -x_s'^2 - y_s'^2 + \xi_s'^2 + \frac{2(x_s'w_x + y_s'w_y)}{v}\xi_s'$$

It follows that $$w_x = \left(\frac{v}{2}\right)A' \tag{21}$$

$$w_y = \left(\frac{v}{2}\right)B' \tag{22}$$

$$x_s' = \frac{A'(A'C' + B'D' + 2E')}{-2(4 + A'^2 + B'^2)} + \frac{C'}{2} \tag{23}$$

$$y_s' = \frac{B'(A'C' + B'D' + 2E')}{-2(4 + A'^2 + B'^2)} + \frac{D'}{2} \tag{24}$$

$$\xi'_s = \frac{-(A'C' + B'D' + 2E')}{4 + A'^2 + B'^2} \quad (25)$$

$$F' = \frac{1}{4}\left(\frac{(A'C' + B'D' + 2E')^2}{4 + A'^2 + B'^2} - C'^2 - D'^2\right) \quad (26)$$

Applying Eq. 20 to sensor 1 reveals that F'=0. In order to solve for the values of A', B', C', D', and E', apply Eq. 20 to sensors 2 through 6.

$$\begin{bmatrix} x'_2\xi'_2 & y'_2\xi'_2 & x'_2 & y'_2 & \xi'_2 \\ x'_3\xi'_3 & y'_3\xi'_3 & x'_3 & y'_3 & \xi'_3 \\ x'_4\xi'_4 & y'_4\xi'_4 & x'_4 & y'_4 & \xi'_4 \\ x'_5\xi'_5 & y'_5\xi'_5 & x'_5 & y'_5 & \xi'_5 \\ x'_6\xi'_6 & y'_6\xi'_6 & x'_6 & y'_6 & \xi'_6 \end{bmatrix} \times \begin{bmatrix} A' \\ B' \\ C' \\ D' \\ E' \end{bmatrix} = \begin{bmatrix} x_2^2 + y_2'^2 - \xi_2'^2 \\ x_3^2 + y_3'^2 - \xi_3'^2 \\ x_4^2 + y_4'^2 - \xi_4'^2 \\ x_5^2 + y_5'^2 - \xi_5'^2 \\ x_6^2 + y_6'^2 - \xi_6'^2 \end{bmatrix}$$

Using Cramer's Rule, the values of A', B', C', D', and E' are as follows:

$$A' = \left(\frac{1}{v^3\mu}\right)(v^2\alpha_{xy} - v^4\alpha_t) \quad B' = \left(\frac{1}{v^3\mu}\right)(v^2\beta_{xy} - v^4\beta_t) \quad C' = \left(\frac{1}{v^3\mu}\right)(v^3\gamma_{xy} - v^5\gamma_t) \quad D' = \left(\frac{1}{v^3\mu}\right)(v^3\delta_{xy} - v^5\delta_t) \quad E' = \left(\frac{1}{v^3\mu}\right)(v^2\varepsilon_{xy} - v^4\varepsilon_t)$$

where $$\mu \equiv \det\begin{bmatrix} x'_2t'_2 & y'_2t'_2 & x'_2 & y'_2 & t'_2 \\ x'_3t'_3 & y'_3t'_3 & x'_3 & y'_3 & t'_3 \\ x'_4t'_4 & y'_4t'_4 & x'_4 & y'_4 & t'_4 \\ x'_5t'_5 & y'_5t'_5 & x'_5 & y'_5 & t'_5 \\ x'_6t'_6 & y'_6t'_6 & x'_6 & y'_6 & t'_6 \end{bmatrix}$$

$$\alpha_{xy} \equiv \det\begin{bmatrix} x_2^2+y_2'^2 & y'_2t'_2 & x'_2 & y'_2 & t'_2 \\ x_3^2+y_3'^2 & y'_3t'_3 & x'_3 & y'_3 & t'_3 \\ x_4^2+y_4'^2 & y'_4t'_4 & x'_4 & y'_4 & t'_4 \\ x_5^2+y_5'^2 & y'_5t'_5 & x'_5 & y'_5 & t'_5 \\ x_6^2+y_6'^2 & y'_6t'_6 & x'_6 & y'_6 & t'_6 \end{bmatrix} \quad \alpha_t \equiv \det\begin{bmatrix} t_2'^2 & y'_2t'_2 & x'_2 & y'_2 & t'_2 \\ t_3'^2 & y'_3t'_3 & x'_3 & y'_3 & t'_3 \\ t_4'^2 & y'_4t'_4 & x'_4 & y'_4 & t'_4 \\ t_5'^2 & y'_5t'_5 & x'_5 & y'_5 & t'_5 \\ t_6'^2 & y'_6t'_6 & x'_6 & y'_6 & t'_6 \end{bmatrix}$$

$$\beta_{xy} \equiv \det\begin{bmatrix} x'_2t'_2 & x_2^2+y_2'^2 & x'_2 & y'_2 & t'_2 \\ x'_3t'_3 & x_3^2+y_3'^2 & x'_3 & y'_3 & t'_3 \\ x'_4t'_4 & x_4^2+y_4'^2 & x'_4 & y'_4 & t'_4 \\ x'_5t'_5 & x_5^2+y_5'^2 & x'_5 & y'_5 & t'_5 \\ x'_6t'_6 & x_6^2+y_6'^2 & x'_6 & y'_6 & t'_6 \end{bmatrix} \quad \beta_t \equiv \det\begin{bmatrix} x'_2t'_2 & t_2'^2 & x'_2 & y'_2 & t'_2 \\ x'_3t'_3 & t_3'^2 & x'_3 & y'_3 & t'_3 \\ x'_4t'_4 & t_4'^2 & x'_4 & y'_4 & t'_4 \\ x'_5t'_5 & t_5'^2 & x'_5 & y'_5 & t'_5 \\ x'_6t'_6 & t_6'^2 & x'_6 & y'_6 & t'_6 \end{bmatrix}$$

$$\gamma_{xy} \equiv \det\begin{bmatrix} x'_2t'_2 & y'_2t'_2 & x_2^2+y_2'^2 & y'_2 & t'_2 \\ x'_3t'_3 & y'_3t'_3 & x_3^2+y_3'^2 & y'_3 & t'_3 \\ x'_4t'_4 & y'_4t'_4 & x_4^2+y_4'^2 & y'_4 & t'_4 \\ x'_5t'_5 & y'_5t'_5 & x_5^2+y_5'^2 & y'_5 & t'_5 \\ x'_6t'_6 & y'_6t'_6 & x_6^2+y_6'^2 & y'_6 & t'_6 \end{bmatrix} \quad \gamma_t \equiv \det\begin{bmatrix} x'_2t'_2 & y'_2t'_2 & t_2'^2 & y'_2 & t'_2 \\ x'_3t'_3 & y'_3t'_3 & t_3'^2 & y'_3 & t'_3 \\ x'_4t'_4 & y'_4t'_4 & t_4'^2 & y'_4 & t'_4 \\ x'_5t'_5 & y'_5t'_5 & t_5'^2 & y'_5 & t'_5 \\ x'_6t'_6 & y'_6t'_6 & t_6'^2 & y'_6 & t'_6 \end{bmatrix}$$

$$\delta_{xy} \equiv \det\begin{bmatrix} x'_2t'_2 & y'_2t'_2 & x'_2 & x_2^2+y_2'^2 & t'_2 \\ x'_3t'_3 & y'_3t'_3 & x'_3 & x_3^2+y_3'^2 & t'_3 \\ x'_4t'_4 & y'_4t'_4 & x'_4 & x_4^2+y_4'^2 & t'_4 \\ x'_5t'_5 & y'_5t'_5 & x'_5 & x_5^2+y_5'^2 & t'_5 \\ x'_6t'_6 & y'_6t'_6 & x'_6 & x_6^2+y_6'^2 & t'_6 \end{bmatrix} \quad \delta_t \equiv \det\begin{bmatrix} x'_2t'_2 & y'_2t'_2 & x'_2 & t_2'^2 & t'_2 \\ x'_3t'_3 & y'_3t'_3 & x'_3 & t_3'^2 & t'_3 \\ x'_4t'_4 & y'_4t'_4 & x'_4 & t_4'^2 & t'_4 \\ x'_5t'_5 & y'_5t'_5 & x'_5 & t_5'^2 & t'_5 \\ x'_6t'_6 & y'_6t'_6 & x'_6 & t_6'^2 & t'_6 \end{bmatrix}$$

$$\varepsilon_{yx} \equiv \det\begin{bmatrix} x'_2t'_2 & y'_2t'_2 & x'_2 & y'_2 & x_2^2+y_2'^2 \\ x'_3t'_3 & y'_3t'_3 & x'_3 & y'_3 & x_3^2+y_3'^2 \\ x'_4t'_4 & y'_4t'_4 & x'_4 & y'_4 & x_4^2+y_4'^2 \\ x'_5t'_5 & y'_5t'_5 & x'_5 & y'_5 & x_5^2+y_5'^2 \\ x'_6t'_6 & y'_6t'_6 & x'_6 & y'_6 & x_6^2+y_6'^2 \end{bmatrix} \quad \varepsilon_t \equiv \det\begin{bmatrix} x'_2t'_2 & y'_2t'_2 & x'_2 & y'_2 & t_2'^2 \\ x'_3t'_3 & y'_3t'_3 & x'_3 & y'_3 & t_3'^2 \\ x'_4t'_4 & y'_4t'_4 & x'_4 & y'_4 & t_4'^2 \\ x'_5t'_5 & y'_5t'_5 & x'_5 & y'_5 & t_5'^2 \\ x'_6t'_6 & y'_6t'_6 & x'_6 & y'_6 & t_6'^2 \end{bmatrix}$$

Substituting the values of A', B', C', D', E', and F' (F'=0) back into Eq. 26 results in an equation which is quartic with respect to $v^2$.

$$0 = -\left(\frac{\alpha_t\delta_t - \beta_t\gamma_t}{\mu^2}\right)^2 v^8 + \left(\frac{-4\delta_t^2 - 4\gamma_t^2}{\mu^2} + \frac{-4\alpha_t\gamma_t\varepsilon_t - 4\beta_t\delta_t\varepsilon_t}{\mu^3}\right)v^6 + \quad (27)$$

$$\left(\frac{2\alpha_t^2\delta_{xy}\delta_t + 2\alpha_{xy}\alpha_t\delta_t^2 + 2\beta_t^2\gamma_{xy}\gamma_t + 2\beta_{xy}\beta_t\gamma_t^2}{\mu^4}\right)v^6 +$$

$$\left(\frac{-2\alpha_{xy}\beta_t\gamma_t\delta_t - 2\alpha_t\beta_{xy}\gamma_t\delta_t - 2\alpha_t\beta_t\gamma_{xy}\delta_t - 2\alpha_t\beta_t\gamma_t\delta_{xy}}{\mu^4}\right)v^6 +$$

$$\left(\frac{4\varepsilon_t^2 + 8\delta_{xy}\delta_t + 8\gamma_{xy}\gamma_t}{\mu^2}\right)v^4 +$$

$$\left(\frac{4\alpha_t\gamma_{xy}\varepsilon_t + 4\alpha_t\gamma_t\varepsilon_{xy} + 4\alpha_{xy}\gamma_t\varepsilon_t + 4\beta_t\delta_{xy}\varepsilon_t + 4\beta_t\delta_t\varepsilon_{xy} + 4\beta_{xy}\delta_t\varepsilon_t}{\mu^3}\right)v^4 +$$

$$\left(\frac{2\alpha_{xy}\beta_{xy}\gamma_t\delta_t + 2\alpha_{xy}\beta_t\gamma_{xy}\delta_t + 2\alpha_{xy}\beta_t\gamma_t\delta_{xy} + 2\alpha_t\beta_{xy}\gamma_{xy}\delta_t + 2\alpha_t\beta_{xy}\gamma_t\delta_{xy} + 2\alpha_t\beta_t\gamma_{xy}\delta_{xy}}{\mu^4}\right)v^4 +$$

$$\left(\frac{-\beta_{xy}^2\gamma_t^2 - \beta_t^2\gamma_{xy}^2 - \alpha_{xy}^2\delta_t^2 - \alpha_t^2\delta_{xy}^2 - 4\alpha_{xy}\alpha_t\delta_{xy}\delta_t - 4\beta_{xy}\beta_t\gamma_{xy}\gamma_t}{\mu^4}\right)v^4 +$$

$$\left(\frac{-8\varepsilon_{xy}\varepsilon_t - 4\delta_{xy}^2 - 4\gamma_{xy}^2}{\mu^2}\right)v^2 +$$

-continued $$\left(\frac{-4\alpha_{xy}\gamma_{xy}\varepsilon_t - 4\beta_t\delta_{xy}\varepsilon_{xy} - 4\beta_{xy}\delta_t\varepsilon_{xy} -}{\mu^3}\right)v^2 +$$

$$\left(\frac{2\beta_{xy}^2\gamma_{xy}\gamma_t + 2\alpha_{xy}\alpha_t\delta_{xy}^2 + 2\beta_{xy}\beta_t\gamma_{xy}^2 + 2\alpha_{xy}^2\delta_{xy}\delta_t}{\mu^4}\right)v^2 +$$

$$\left(\frac{-2\alpha_{xy}\beta_{xy}\gamma_t\delta_{xy} - 2\alpha_t\beta_{xy}\gamma_{xy}\delta_{xy} -}{\mu^4}\right)v^2 + \left(\frac{4\varepsilon_{xy}^2}{\mu^2}\right) +$$

$$\frac{4\beta_{xy}\delta_{xy}\varepsilon_{xy} + 4\alpha_{xy}\gamma_{xy}\varepsilon_{xy}}{\mu^3} + \frac{2\alpha_{xy}\beta_{xy}\gamma_{xy}\delta_{xy} - \alpha_{xy}^2\delta_{xy}^2 - \beta_{xy}^2\gamma_{xy}^2}{\mu^4}\right)$$

At block 202, four or less unique, positive values, of v can be calculated from Eq. 27. Of these, the physically plausible solutions for v are the ones that possess no imaginary component and results in a non-positive value of $t'_s$ (confirming the signal was emitted prior to or at the same time as the first detection) as derived by way of Eq. 25 (remembering that $t'_s = \xi'_s/v$). From each value of v matching these criteria, corresponding values of c, $w_x$, $w_y$, $x'_s$, $y'_s$ and can be calculated by utilizing the relationships in Eqs. 17, 21, 22, 23, and 24, respectively at block 203. Note that $w_x$ and $w_y$ uniquely describe the velocity of the medium; from these 2 values the velocity can be easily expressed in other forms such as magnitude and direction.

Finally, the solutions can be returned into the initial coordinate system by $$\begin{bmatrix} x_s \\ y_s \\ t_s \end{bmatrix} = \begin{bmatrix} x'_s + x_1 \\ y'_s + y_1 \\ t'_s + t_1 \end{bmatrix}$$

Since, six unknowns ($x_s$, $y_s$, $t_s$, c, $w_x$, $w_y$) are being solved for in this case, six sensors are required (k=6).

iii. Planar (2-D) Array & Medium Drifting at Known, Constant Velocity

Source locations can be also be calculated analytically for a 2D array of sensors if the medium is "drifting" uniformly at a known, constant velocity. For example, this technique could be applied to acoustic sensors on a windy day or hydro-acoustic sensors in an ocean current. For this case, it is assumed that the velocity of the medium's drift is measured by some other means and expressed as projections onto the x and y axes of the sensors' coordinate system ($w_x$ and $w_y$, respectively). Constant drift of a medium causes the center of the circular wavefront of a signal to undergo translational motion, but does not distort the shape of the wavefront. Thus, the motion of the medium can be accounted for by incorporating linearly time-dependent "correctional" terms to the x and y positions of the source ($x_s$ and $y_s$, respectively).

$$(x-[x_s+w_x(t-t_s)])^2 + (y-[y_s+w_y(t-t_s)])^2 = c^2(t-t_s)^2 \quad (28)$$

Expand equation (28) and collect like terms.

$$0 = -x^2 - y^2 + (c^2 - w_x^2 - w_y^2)t^2 + (2w_x)xt + (2w_y)yt + 2(x_s - w_xt_s)x + \quad (29)$$
$$2(y_s - w_yt_s)y + 2(w_x^2t_s + w_y^2t_s - c^2t_s - x_sw_x - y_sw_y)t -$$
$$x_s^2 - y_s^2 + c^2t_s^2 + 2x_sw_xt_s + 2y_sw_yt_s - w_x^2t_s^2 - w_y^2t_s^2$$

For convenience, define the following 3 terms and substitute back into Eq. 29:

$$v \equiv \sqrt{c^2 - w_x^2 - w_y^2} \quad (30)$$
$$\xi \equiv vt$$
$$\xi_s \equiv vt_s$$

$$0 = -x^2 - y^2 + \xi^2 + \left(\frac{2w_x}{v}\right)x\xi + \left(\frac{2w_y}{v}\right)y\xi + 2\left(x_s - \frac{w_x\xi_s}{v}\right)x + \quad (31)$$
$$2\left(y_s - \frac{w_y\xi_s}{v}\right)y + \left(\frac{2}{v}\right)(-v\xi_s - x_sw_x - y_sw_y)\xi -$$
$$x_s^2 - y_s^2 + \xi_s^2 + \frac{2(x_sw_x + y_sw_y)}{v}\xi_s$$

In terms of x, y, ξ and, Eq. 31 has the following form:

$$0 = -x^2 - y^2 + \xi^2 + \left(\frac{2w_x}{v}\right)x\xi + \left(\frac{2w_y}{v}\right)y\xi + Ax + By + C\xi + D \quad (32)$$

where the values of A, B, C, and D are yet to be determined.

At block 201, it is convenient to introduce a new coordinate system (x', y',t') in which the origin lays at the point in space-time where the first sensor to detect the signal made its detection. In the case of simultaneous first detections, any of the sensors that detected the signal first can be chosen. For this example, it will be assumed that sensor 1 detected the signal at the same time or at an earlier time than all the other sensors in the array.

$$\begin{bmatrix} x' \\ y' \\ t' \end{bmatrix} \equiv \begin{bmatrix} x - x_1 \\ y - y_1 \\ t - t_1 \end{bmatrix}$$

Eq. 32 can be expressed in the new coordinate system as $$0 = -x'^2 - y'^2 + \xi'^2 + \left(\frac{2w_x}{v}\right)x'\xi' + \quad (33)$$
$$\left(\frac{2w_y}{v}\right)y'\xi' + A'x' + B'y' + C'\xi' + D'$$

where $$A' = 2\left(x'_2 - \frac{w_x\xi'_s}{v}\right)$$
$$B' = 2\left(y'_s - \frac{w_y\xi'_s}{v}\right)$$

-continued $$C' = \left(\frac{2}{v}\right)(-v\xi'_s - x'_s w_x - y'_s w_y)$$

$$D' = -x'^2_s - y'^2_s + \xi'^2_s + \frac{2(x'_s w_x + y'_s w_y)}{v}\xi'_s$$

It follows that $$x'_s = \frac{(v^2 + w_y^2)A' - w_x w_y B' - v w_x C'}{2(v^2 + w_x^2 + w_y^2)} \quad (34)$$

$$y'_s = \frac{-w_x w_y A' + (v^2 + w_x^2)B' - v w_y C'}{2(v^2 + w_x^2 + w_y^2)} \quad (35)$$

$$\xi'_s = -\frac{v w_x A' + (v^2 + w_x^2)B' - v w_y C'}{2(v^2 + w_x^2 + w_y^2)} \quad (36)$$

$$D' = \left(\frac{1}{4}\right)\left(\frac{(w_x A' + w_y B' + vC')^2}{v^2 + w_x^2 + w_y^2} - A'^2 - B'^2\right) \quad (37)$$

Applying Eq. 33 to sensor 1 reveals that D'=0. In order to solve for the values of A', B', and C', apply Eq. 33 to sensors 2 through 4.

$$\begin{bmatrix} x'_2 & y'_2 & \xi'_2 \\ x'_3 & y'_3 & \xi'_3 \\ x'_4 & y'_4 & \xi'_4 \end{bmatrix} \times \begin{bmatrix} A' \\ B' \\ C' \end{bmatrix} = \begin{bmatrix} x'^2_2 + y'^2_2 - \xi'^2_2 - \left(\frac{2w_x}{v}\right)x'_2\xi'_2 - \left(\frac{2w_y}{v}\right)y'_2\xi'_2 \\ x'^2_3 + y'^2_3 - \xi'^2_3 - \left(\frac{2w_x}{v}\right)x'_3\xi'_3 - \left(\frac{2w_y}{v}\right)y'_3\xi'_3 \\ x'^2_4 + y'^2_4 - \xi'^2_4 - \left(\frac{2w_x}{v}\right)x'_4\xi'_4 - \left(\frac{2w_y}{v}\right)y'_4\xi'_4 \end{bmatrix}$$

Using Cramer's Rule, the values of A', B', and C' are as follows:

$$A' = \left(\frac{1}{v\mu}\right)(v\alpha_{xy} - v^3\alpha_t) \quad B' = \left(\frac{1}{v\mu}\right)(v\beta_{xy} - v^3\beta_t)$$

$$C' = \left(\frac{1}{v\mu}\right)(\gamma_{xy} - v^2\gamma_t)$$

where $$\mu = det\begin{bmatrix} x'_2 & y'_2 & t'_2 \\ x'_3 & y'_3 & t'_3 \\ x'_4 & y'_4 & t'_4 \end{bmatrix}$$

$$\alpha_{xy} = det\begin{bmatrix} x'^2_2 + y'^2_2 - 2w_x x'_2 t'_2 - 2w_y y'_2 t'_2 & y'_2 & t'_2 \\ x'^2_3 + y'^2_3 - 2w_x x'_3 t'_3 - 2w_y y'_3 t'_3 & y'_3 & t'_3 \\ x'^2_4 + y'^2_4 - 2w_x x'_4 t'_4 - 2w_y y'_4 t'_4 & y'_4 & t'_4 \end{bmatrix}$$

$$\alpha_t = det\begin{bmatrix} t'^2_2 & y'_2 & t'_2 \\ t'^2_3 & y'_3 & t'_3 \\ t'^2_4 & y'_4 & t'_4 \end{bmatrix}$$

$$\beta_{xy} = det\begin{bmatrix} x'_2 & x'^2_2 + y'^2_2 - 2w_x x'_2 t'_2 - 2w_y y'_2 t'_2 & t'_2 \\ x'_3 & x'^2_3 + y'^2_3 - 2w_x x'_3 t'_3 - 2w_y y'_3 t'_3 & t'_3 \\ x'_4 & x'^2_4 + y'^2_4 - 2w_x x'_4 t'_4 - 2w_y y'_4 t'_4 & t'_3 \end{bmatrix}$$

$$\beta_t = det\begin{bmatrix} x'_2 & t'^2_2 & t'_2 \\ x'_3 & t'^2_3 & t'_3 \\ x'_4 & t'^2_4 & t'_4 \end{bmatrix}$$

$$\gamma_{xy} = det\begin{bmatrix} x'_2 & y'_2 & x'^2_2 + y'^2_2 - 2w_x x'_2 t'_2 - 2w_y y'_2 t'_2 \\ x'_3 & y'_3 & x'^2_3 + y'^2_3 - 2w_x x'_3 t'_3 - 2w_y y'_3 t'_3 \\ x'_4 & y'_4 & x'^2_4 + y'^2_4 - 2w_x x'_4 t'_4 - 2w_y y'_4 t'_4 \end{bmatrix}$$

$$\gamma_t = det\begin{bmatrix} x'_2 & y'_2 & t'^2_2 \\ x'_3 & y'_3 & t'^2_3 \\ x'_4 & y'_4 & t'^2_4 \end{bmatrix}$$

Substituting the values of A', B', C', and D' back into Eq. 37 results in an equation which is cubic with respect to $v^2$.

$$0 = (\alpha_t^2 + \beta_t^2)v^6 + (w_y^2\alpha_t^2 + w_x^2\beta_t^2 - \gamma_t^2)v^4 - \quad (38)$$
$$2(w_x\alpha_t\gamma_t + \beta_{xy}\beta_t + w_y\beta_t\gamma_t + \alpha_{xy}\alpha_t + w_x w_y \alpha_t\beta_t)v^4 +$$
$$(\alpha_{xy}^2 + \beta_{xy}^2 + 2w_x\alpha_t\gamma_{xy} + 2w_y\beta_t\gamma_{xy} +$$
$$2\gamma_{xy}\gamma_t + 2w_x\alpha_{xy}\gamma_t + 2w_y\beta_{xy}\gamma_t)v^2 +$$
$$(2w_x w_y\alpha_{xy}\beta_t + 2w_x w_y\alpha_t\beta_{xy} - 2w_x^2\beta_{xy}\beta_t - 2w_y^2\alpha_{xy}\alpha_t)v^2 +$$
$$w_y^2\alpha_{xy}^2 + w_x^2\beta_{xy}^2 - \gamma_{xy}^2 - 2w_x\alpha_{xy}\gamma_{xy} - 2w_y\beta_{xy}\gamma_{xy} - 2w_x w_y\alpha_{xy}\beta_{xy}$$

At block 202, three or less unique, positive values of v can be calculated from Eq. 38. Of these, the physically plausible solutions for v are the ones that possess no imaginary component and results in non-positive values of $t'_s$ (confirming that the signal was emitted prior to or at the same time as the first detection) as derived by way of Eq. 36 (remembering that $t'_s = \xi'_s/v$). From each value of v matching these criteria, corresponding values of c, $x'_s$, and $y'_s$ can be calculated by utilizing the relationships in Eqs. 30, 34, and 35, respectively at block 203.

Finally, the solutions can be returned into the initial coordinate system by $$\begin{bmatrix} x_s \\ y_s \\ t_s \end{bmatrix} = \begin{bmatrix} x'_s + x_1 \\ y'_s + y_1 \\ t'_s + t_1 \end{bmatrix}$$

Since, 4 unknowns ($x_s$, $y_s$, $t_s$, c) are being solved for in this case, 4 sensors are required (k=4).

iv. Spatial (3-D) Array & Static Medium

This case is analogous to case (i); the difference being the introduction of a new variable, z, which is treated identically to x and y. Thus the starting equation is the following:

$$(x-x_s)^2 + (y-y_s)^2 + (z-z_s)^2 = c^2(t-t_s)^2 \quad (39)$$

where $x_s$, $y_s$, $z_s$, $t_s$, and $c$ represent the position of the source along the x-axis, the position of the source along the y-axis, the position of the source along the z-axis, the time that the signal was released, and the signal speed, respectively. The form of this equation can be changed to $$x^2+y^2+z^2-(ct)^2+Ax+By+Cz+Dct+E=0 \qquad (40)$$

where the values of A, B, C, D, and E are yet to be determined.

At block 201, it is convenient to introduce a new coordinate system (x', y', z', t') in which the origin lays at the point in space-time where the first sensor to detect the signal made its detection. In the case of simultaneous first detections, any of the sensors that detected the signal first can be chosen. For this example, it will be assumed that sensor 1 detected the signal at the same time or at an earlier time than all the other sensors in the array.

$$\begin{bmatrix} x' \\ y' \\ z' \\ t' \end{bmatrix} \equiv \begin{bmatrix} x-x_1 \\ y-y_1 \\ z-z_1 \\ t-t_1 \end{bmatrix}$$

In the new coordinate system, equation (40) would be written as $$x'^2+y'^2+z'^2-(ct')^2+A'x'+B'y'+C'z'+D'ct'+E'=0$$

However, since $x'_1=y'_1=z'_1=t'_1=0$, $E'=0$.

$$x'^2+y'^2+z'^2-(ct')^2+A'x'+B'y'+C'z'+D'ct'=0 \qquad (41)$$

By completing the square, equation (41) can be placed into the same form as equation (39), as follows:

$$\left(x'+\frac{A'}{2}\right)^2 + \left(y'+\frac{B'}{2}\right)^2 + \left(z'+\frac{C'}{2}\right)^2 = \left(ct'-\frac{D'}{2}\right)^2 - \frac{D'^2-A'^2-B'^2-C'^2}{4}$$

It is now clear that, $$\frac{A'}{2} = -x'_s \qquad (42)$$

$$\frac{B'}{2} = -y'_s \qquad (43)$$

$$\frac{C'}{2} = -z'_s \qquad (44)$$

$$\frac{D'}{2} = ct'_s \qquad (45)$$

$$D'^2 - A'^2 - B'^2 - C'^2 = 0 \qquad (46)$$

In order to solve for the values of A', B', C', and D', apply Eq. 41 to sensors 2, 3, 4, and 5.

$$\begin{bmatrix} x'_2 & y'_2 & z'_2 & ct'_2 \\ x'_3 & y'_3 & z'_3 & ct'_3 \\ x'_4 & y'_4 & z'_4 & ct'_4 \\ x'_5 & y'_5 & z'_5 & ct'_5 \end{bmatrix} \times \begin{bmatrix} A' \\ B' \\ C' \\ D' \end{bmatrix} = -\begin{bmatrix} x_2'^2+y_2'^2+z_2'^2-(ct'_2)^2 \\ x_3'^2+y_3'^2+z_3'^2-(ct'_3)^2 \\ x_4'^2+y_4'^2+z_4'^2-(ct'_4)^2 \\ x_5'^2+y_5'^2+z_5'^2-(ct'_5)^2 \end{bmatrix}$$

The values of A', B', C', and D' can be solved via Cramer's Rule.

$$A' = \frac{c^2 \det\begin{bmatrix} t_2'^2 & y'_2 & z'_2 & t'_2 \\ t_3'^2 & y'_3 & z'_3 & t'_3 \\ t_4'^2 & y'_4 & z'_4 & t'_4 \\ t_5'^2 & y'_5 & z'_5 & t'_5 \end{bmatrix} - \det\begin{bmatrix} x_2'^2+y_2'^2+z_2'^2 & y'_2 & z'_2 & t'_2 \\ x_3'^2+y_3'^2+z_3'^2 & y'_3 & z'_3 & t'_3 \\ x_4'^2+y_4'^2+z_4'^2 & y'_4 & z'_4 & t'_4 \\ x_5'^2+y_5'^2+z_5'^2 & y'_5 & z'_5 & t'_5 \end{bmatrix}}{\det\begin{bmatrix} x'_2 & y'_2 & z'_2 & t'_2 \\ x'_3 & y'_3 & z'_3 & t'_3 \\ x'_4 & y'_4 & z'_4 & t'_4 \\ x'_5 & y'_5 & z'_5 & t'_5 \end{bmatrix}}$$

$$B' = \frac{c^2 \det\begin{bmatrix} x'_2 & t_2'^2 & z'_2 & t'_2 \\ x'_3 & t_3'^2 & z'_3 & t'_3 \\ x'_4 & t_4'^2 & z'_4 & t'_4 \\ x'_5 & t_5'^2 & z'_5 & t'_5 \end{bmatrix} - \det\begin{bmatrix} x'_2 & x_2'^2+y_2'^2+z_2'^2 & z'_2 & t'_2 \\ x'_3 & x_3'^2+y_3'^2+z_3'^2 & z'_3 & t'_3 \\ x'_4 & x_4'^2+y_4'^2+z_4'^2 & z'_4 & t'_4 \\ x'_5 & x_5'^2+y_5'^2+z_5'^2 & z'_5 & t'_5 \end{bmatrix}}{\det\begin{bmatrix} x'_2 & y'_2 & z'_2 & t'_2 \\ x'_3 & y'_3 & z'_3 & t'_3 \\ x'_4 & y'_4 & z'_4 & t'_4 \\ x'_5 & y'_5 & z'_5 & t'_5 \end{bmatrix}}$$

$$C' = \frac{c^2 \det\begin{bmatrix} x'_2 & y'_2 & t_2'^2 & t'_2 \\ x'_3 & y'_3 & t_3'^2 & t'_3 \\ x'_4 & y'_4 & t_4'^2 & t'_4 \\ x'_5 & y'_5 & t_5'^2 & t'_5 \end{bmatrix} - \det\begin{bmatrix} x'_2 & y'_2 & x_2'^2+y_2'^2+z_2'^2 & t'_2 \\ x'_3 & y'_3 & x_3'^2+y_3'^2+z_3'^2 & t'_3 \\ x'_4 & y'_4 & x_4'^2+y_4'^2+z_4'^2 & t'_4 \\ x'_5 & y'_5 & x_5'^2+y_5'^2+z_5'^2 & t'_5 \end{bmatrix}}{\det\begin{bmatrix} x'_2 & y'_2 & z'_2 & t'_2 \\ x'_3 & y'_3 & z'_3 & t'_3 \\ x'_4 & y'_4 & z'_4 & t'_4 \\ x'_5 & y'_5 & z'_5 & t'_5 \end{bmatrix}}$$

$$D' = \frac{c^2 \det\begin{bmatrix} x'_2 & y'_2 & z'_2 & t_2'^2 \\ x'_3 & y'_3 & z'_3 & t_3'^2 \\ x'_4 & y'_4 & z'_4 & t_4'^2 \\ x'_5 & y'_5 & z'_5 & t_5'^2 \end{bmatrix} - \det\begin{bmatrix} x'_2 & y'_2 & z'_2 & x_2'^2+y_2'^2+z_2'^2 \\ x'_3 & y'_3 & z'_3 & x_3'^2+y_3'^2+z_3'^2 \\ x'_4 & y'_4 & z'_4 & x_4'^2+y_4'^2+z_4'^2 \\ x'_5 & y'_5 & z'_5 & x_5'^2+y_5'^2+z_5'^2 \end{bmatrix}}{c \det\begin{bmatrix} x'_2 & y'_2 & z'_2 & t'_2 \\ x'_3 & y'_3 & z'_3 & t'_3 \\ x'_4 & y'_4 & z'_4 & t'_4 \\ x'_5 & y'_5 & z'_5 & t'_5 \end{bmatrix}}$$

Since c appears in all 4 terms, it must be evaluated first. This can be accomplished by substituting the above expressions for A', B', C', and D' into Eq. 46 to yield $$0 = (\alpha^2+\beta^2+\gamma^2)c^6 - (\delta^2 2\alpha\epsilon + 2\beta\zeta + \gamma\eta)c^4 + (\epsilon^2+\zeta^2+\eta^2+2\delta\theta)c^2 - \theta^2$$

where $$\alpha = \begin{bmatrix} t_2'^2 & y_2' & z_2' & t_2' \\ t_3'^2 & y_3' & z_3' & t_3' \\ t_4'^2 & y_4' & z_4' & t_4' \\ t_5'^2 & y_5' & z_5' & t_5' \end{bmatrix} \quad \beta = \begin{bmatrix} t_2'^2 & x_2' & z_2' & t_2' \\ t_3'^2 & x_3' & z_3' & t_3' \\ t_4'^2 & x_4' & z_4' & t_4' \\ t_5'^2 & x_5' & z_5' & t_5' \end{bmatrix}$$

$$\gamma = \begin{bmatrix} t_2'^2 & x_2' & y_2' & t_2' \\ t_3'^2 & x_3' & y_3' & t_3' \\ t_4'^2 & x_4' & y_4' & t_4' \\ t_5'^2 & x_5' & y_5' & t_5' \end{bmatrix} \quad \delta = \begin{bmatrix} t_2'^2 & x_2' & y_2' & z_2' \\ t_3'^2 & x_3' & y_3' & z_3' \\ t_4'^2 & x_4' & y_4' & z_4' \\ t_5'^2 & x_5' & y_5' & z_5' \end{bmatrix}$$

$$\varepsilon = \begin{bmatrix} x_2'^2 + y_2'^2 + z_2'^2 & y_2' & z_2' & t_2' \\ x_3'^2 + y_3'^2 + z_3'^2 & y_3' & z_3' & t_3' \\ x_4'^2 + y_4'^2 + z_4'^2 & y_4' & z_4' & t_4' \\ x_5'^2 + y_5'^2 + z_5'^2 & y_5' & z_5' & t_5' \end{bmatrix}$$

$$\zeta = \begin{bmatrix} x_2'^2 + y_2'^2 + z_2'^2 & x_2' & z_2' & t_2' \\ x_3'^2 + y_3'^2 + z_3'^2 & x_3' & z_3' & t_3' \\ x_4'^2 + y_4'^2 + z_4'^2 & x_4' & z_4' & t_4' \\ x_5'^2 + y_5'^2 + z_5'^2 & x_5' & z_5' & t_5' \end{bmatrix}$$

$$\eta = \begin{bmatrix} x_2'^2 + y_2'^2 + z_2'^2 & x_2' & y_2' & t_2' \\ x_3'^2 + y_3'^2 + z_3'^2 & x_3' & y_3' & t_3' \\ x_4'^2 + y_4'^2 + z_4'^2 & x_4' & y_4' & t_4' \\ x_5'^2 + y_5'^2 + z_5'^2 & x_5' & y_5' & t_5' \end{bmatrix}$$

$$\theta = \begin{bmatrix} x_2'^2 + y_2'^2 + z_2'^2 & x_2' & y_2' & z_2' \\ x_3'^2 + y_3'^2 + z_3'^2 & x_3' & y_3' & z_3' \\ x_4'^2 + y_4'^2 + z_4'^2 & x_4' & y_4' & z_4' \\ x_5'^2 + y_5'^2 + z_5'^2 & x_5' & y_5' & z_5' \end{bmatrix}$$

At block 202, since c must have a positive value, there are at most 3 unique solutions. Of these, the physically plausible solutions are the ones that possess no imaginary component and result in a non-positive values of $t'_s$ (confirming that the signal was emitted prior to or at the same time as the first detection) as derived by way of equation (45). Once the values of c have been determined, $x'_s$, $y'_s$, and $z'_s$ can be calculated from Eqs. 42, 43, and 44, respectively at block 203.

Finally, the results can be returned into the initial coordinate system.

$$\begin{bmatrix} x_s \\ y_s \\ z_s \\ t_s \end{bmatrix} = \begin{bmatrix} x'_s + x_1 \\ y'_s + y_1 \\ z'_s + z_1 \\ t'_s + t_1 \end{bmatrix}$$

Once the location of the signal source is known in Cartesian coordinates (i.e. once the values of $x_s$, $y_s$, and $z_s$ have been determined), the elevation angle to the source with respect to any reference plane in 3 dimensional space can be calculated by a transformation to spherical coordinates. Since, 5 unknowns ($x_s$, $y_s$, $z_s$, $t_s$, c) are being solved for in this case, 5 sensors are required (k=5).

v. Spatial (3-D) Array & Medium Drifting at Unknown, Constant Velocity

This case is analogous to case (ii); the difference being the introduction of a new variable, z, which is treated the same way as x and y. Since, 7 unknowns ($x_s$, $y_s$, $z_s$, $t_s$, c, $w_x$, $w_y$) are being solved for in this case, 7 sensors are required (k=7).

vi. Spatial (3-D) Array & Medium Drifting at Known, Constant Velocity

This case is analogous to case (iii); the difference being the introduction of a new variable, z, which is treated the same way as x and y. Since, 5 unknowns ($x_s$, $y_s$, $z_s$, $t_s$, c) are being solved for in this case, 5 sensors are required (k=5).

III. Exemplary Operating Environment

Figure 4:
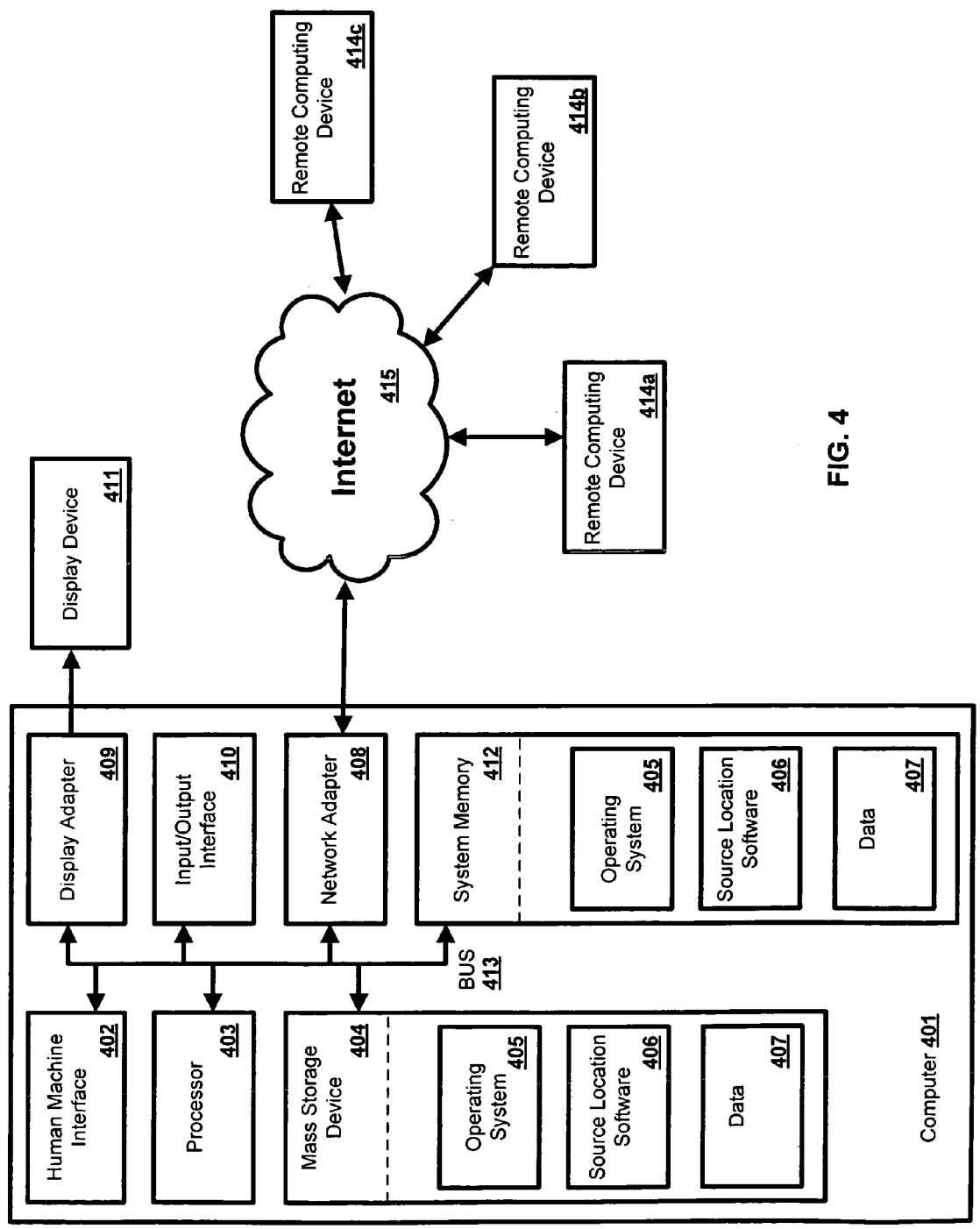
FIG. 4 is an exemplary operating environment.

FIG. 4 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices (memory elements).

The method disclosed herein can be implemented via a general-purpose computing device in the form of a computer 401. The components of the computer 401 can include, but are not limited to, one or more processors or processing units 403, a system memory 412, and a system bus 413 that couples various system components including the processor 403 to the system memory 412.

The system bus 413 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 413, and all buses specified in this description can also be implemented over a wired or wireless network connection and each of the subsystems, including the processor 403, a mass storage device 404, an operating system 405, source location (application) software 406, data 407, a network adapter 408, system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically includes a variety of computer readable media. Such media can be any available media that is accessible by the computer 401 and includes both volatile and non-volatile media, removable and non-removable media. The system memory 412 includes computer readable media in the form of volatile memory, such as random access memory (RAM), and/or non-volatile memory, such as read only memory (ROM). The system memory 412 typically contains data such as data 407 and/or program modules such as operating system 405 and source location (application) software 406 that are immediately accessible to and/or are presently operated on by the processing unit 403.

The computer 401 may also include other removable/non-removable, volatile/non-volatile computer storage media. By way of example, FIG. 4 illustrates a mass storage device 404 which can provide non-volatile storage of computer code, computer readable instructions, data structures, program modules, and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 404, including by way of example, an operating system 405 and source location (application) software 406. Each of the operating system 405 and source location (application) software 406 (or some combination thereof) may include elements of the programming and the source location (application) software 406. Data 407 can also be stored on the mass storage device 404. Data 407 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 401 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 403 via a human machine interface 402 that is coupled to the system bus 413, but may be connected by other interface and bus structures, such as a parallel port, game port, or a universal serial bus (USB).

A display device 411 can also be connected to the system bus 413 via an interface, such as a display adapter 409. For example, a display device can be a monitor or an LCD (Liquid Crystal Display). In addition to the display device 411, other output peripheral devices can include components such as speakers (not shown) and a printer (not shown) which can be connected to the computer 401 via Input/Output Interface 410.

The computer 401 can operate in a networked environment using logical connections to one or more remote computing devices 414a,b,c. By way of example, a remote computing device can be a personal computer, portable computer, a server, a router, a network computer, a peer device or other common network node, and so on. Logical connections between the computer 401 and a remote computing device 414a,b,c can be made via a local area network (LAN) and a general wide area network (WAN). Such network connections can be through a network adapter 408. A network adapter 408 can be implemented in both wired and wireless environments. Such networking environments are commonplace in offices, enterprise-wide computer networks, intranets, and the Internet 415. The computer 401 can communicate with and transfer data between itself and one or more sensors (not shown). Such communication can be via wireless or wired connections.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer.

An implementation of the disclosed method may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

IV. Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The seeding method and source localization technique described above has been implemented via a series of MATLAB functions and compiled C source code called by MATLAB functions. All of these procedures are coded in a single, self-extracting MATLAB function named srcLoc.m. This function, when initialized self-extracts and compiles all required C source and MATLAB subfunctions required to estimate near-field source locations described herein.

The I53US array is located in Fairbanks, Ak. The I55US array is located in Windless Bight, Antarctica approximately 25 km northeast of McMurdo Station. Both arrays are comprised of eight Chaparral model 5 microphones. The eight microphones of each array are arranged in an outer pentagonal pattern (5 microphones; aperture 1.7 km) concentric with an inner triangle pattern (3 microphones, aperture 0.1 km). This design provides excellent response across a wide frequency band with little spatial aliasing. The Chaparral microphones have a pass band that extends from approximately 0.02 Hz to above the digital Nyquist frequency of 10 Hz. The analog data are low-pass filtered to avoid time aliasing and are sampled at 20 Hz.

A. Array I53US i. Howitzer (Start of 10 k Run in Fairbanks)

Figure 5:
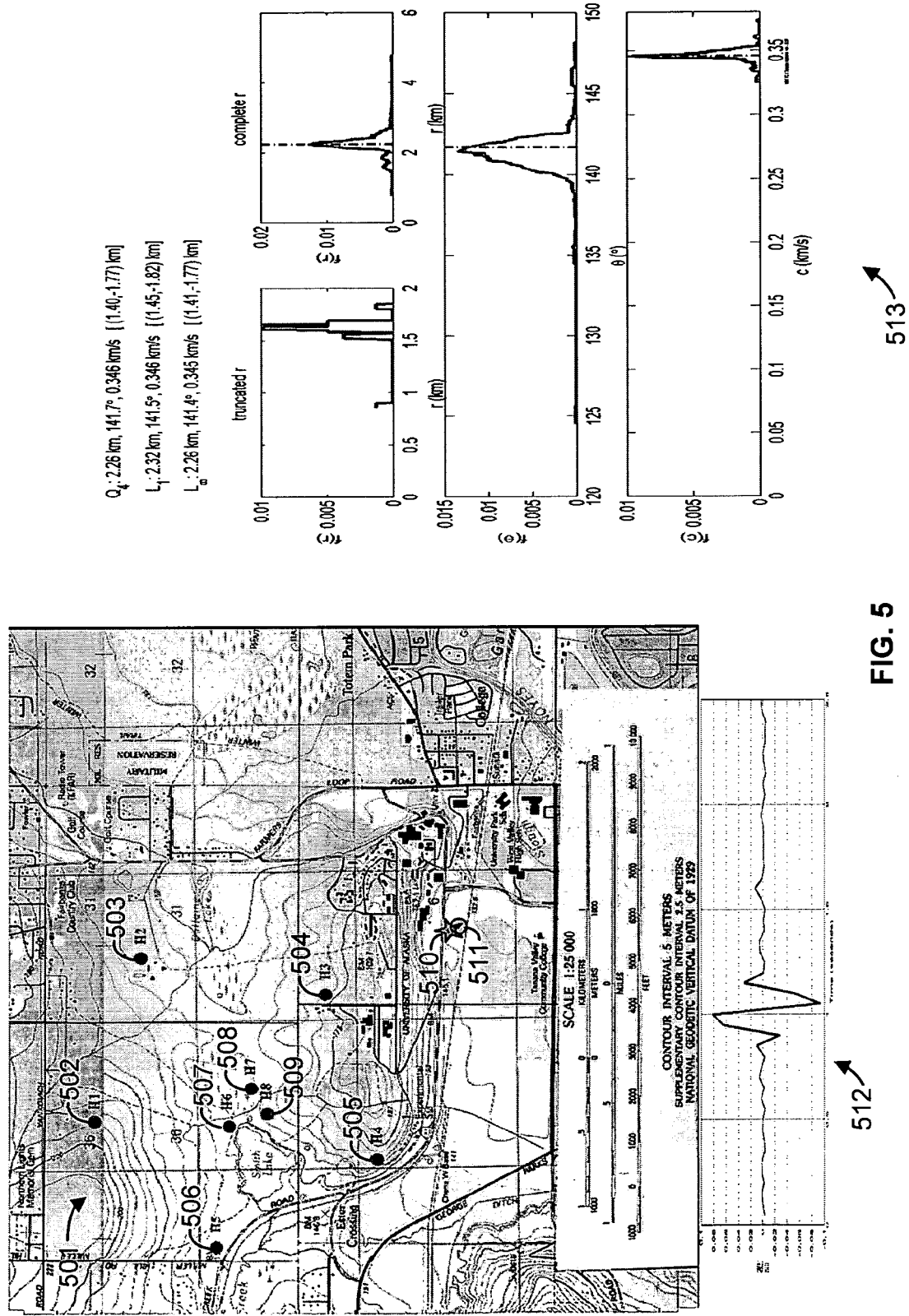
FIG. 5 displays the source localization (blue dot) for a howitzer cannon that marked the beginning of the Midnight Sun Run on 21 Jun. 2003 in Fairbanks, Ak. The figure depicts the UAF I53US infrasound array (red circles) and source location (red star) superposed on a topographic map (upper left panel). A typical sensor trace is shown in the lower left panel. Results from the localization procedure are shown in the right panels, including the kernel density estimates of the distributions of analytical seeding method.

To examine the usefulness of the method in locating real sources, it was applied to several cases in which the location of the signal source was known. One such example was the firing of a Howitzer cannon that marked the beginning of the "Midnight Sun Run" race in Fairbanks, Ak. The results of the location search are displayed in FIG. 5. The cannon was located at a distance of 1.76 km from the center of array 501, comprised of sensors 502, 503, 504, 505, 506, 507, 508, and 509, with an azimuth of 137.25°, indicated by star 510. The estimate of the location was at a range of 1.80 km with an azimuth of 137.37°, indicated by circle 511. The estimated signal speed was 0.340 km/s which is a reasonable value considering the air temperature at the time of the event. A typical sensor trace is shown in the lower left panel 512. Results from the localization procedure are shown in the right panels 513, including the kernel density estimates of the distributions of analytical seeding method.

Figure 6:
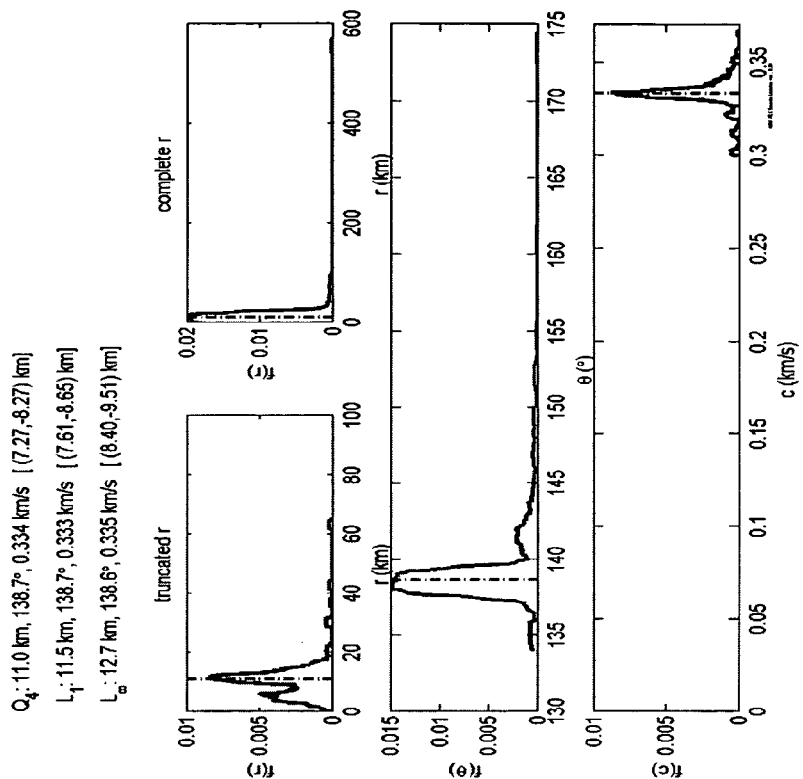
FIG. 6 displays the source localization for a 12-lb. TNT blast on 20 Aug. 2003. The figure depicts the UAF I53US infrasound array (red circles) and source localization (red asterisk) superposed on a topographic map (upper left panel). A typical sensor trace is shown in the lower left panel. Results from the localization procedure are shown in the right panels, including the kernel density estimates of the distributions of analytical seeding method. A line-of-sight localization is indicated as a red line (upper left panel) from reference sensor to source.
Figure 6:
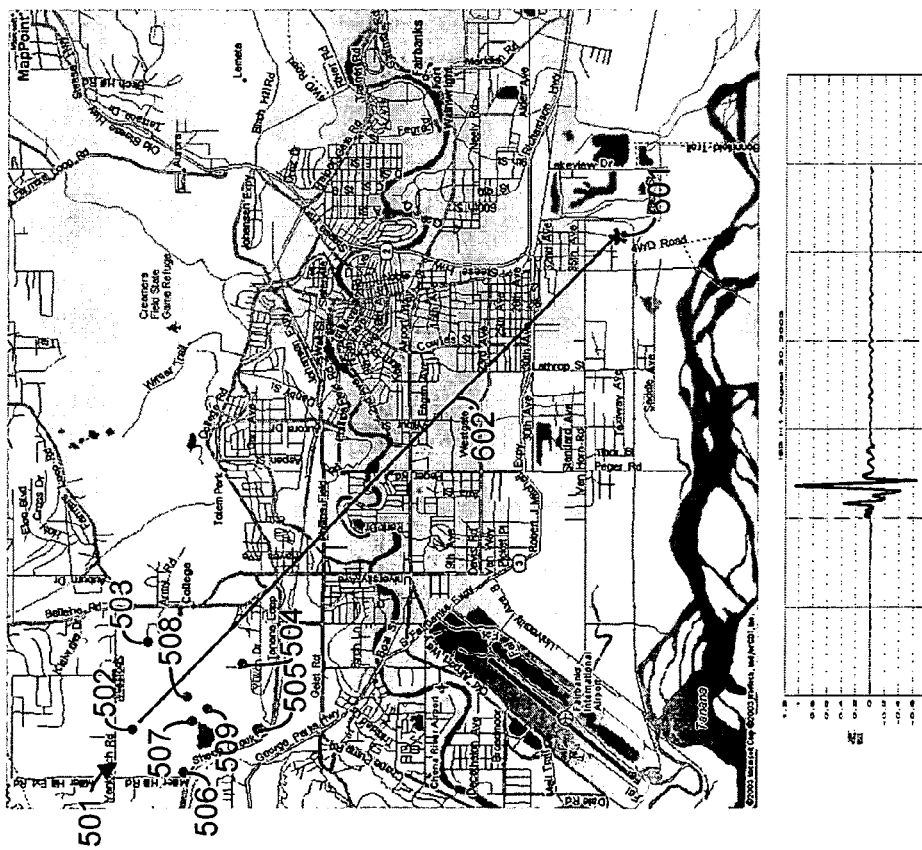

The location estimation represents a 40 m error at a range of 1760 m or 2.3% and an error of 0.12° in azimuth. Estimated ranges usually have less than 10% error for sources within 10 km of the I53US array (1.7 km in aperture). Estimated azimuths are normally within 0.25° of the measured azimuth for sources located outside of the array, independent of range. Location estimation is most accurate for sources located within the array. However, at such close proximity, range and azimuth are inappropriate means of measuring location accuracy.

ii. Local Dynamite Explosion 12-lbs. of TNT were detonated at a firing range in Fairbanks, Ak. FIG. 6 displays the source localization resulting from the method disclosed for the blast signal. The figure depicts the UAF I53US infrasound array 501, comprised of sensors 502, 503, 504, 505, 506, 507, 508, and 509, and source localization 601 superposed on a topographic map. A line-of-sight localization is indicated as line 602 from reference sensor 502 to source. A typical sensor trace is shown in the lower left panel 603. Results from the localization procedure are shown in the right panels 604, including the kernel density estimates of the distributions of analytical seeding method.

B. Array I55US i. Mt Erebus Eruptions

Figure 7:
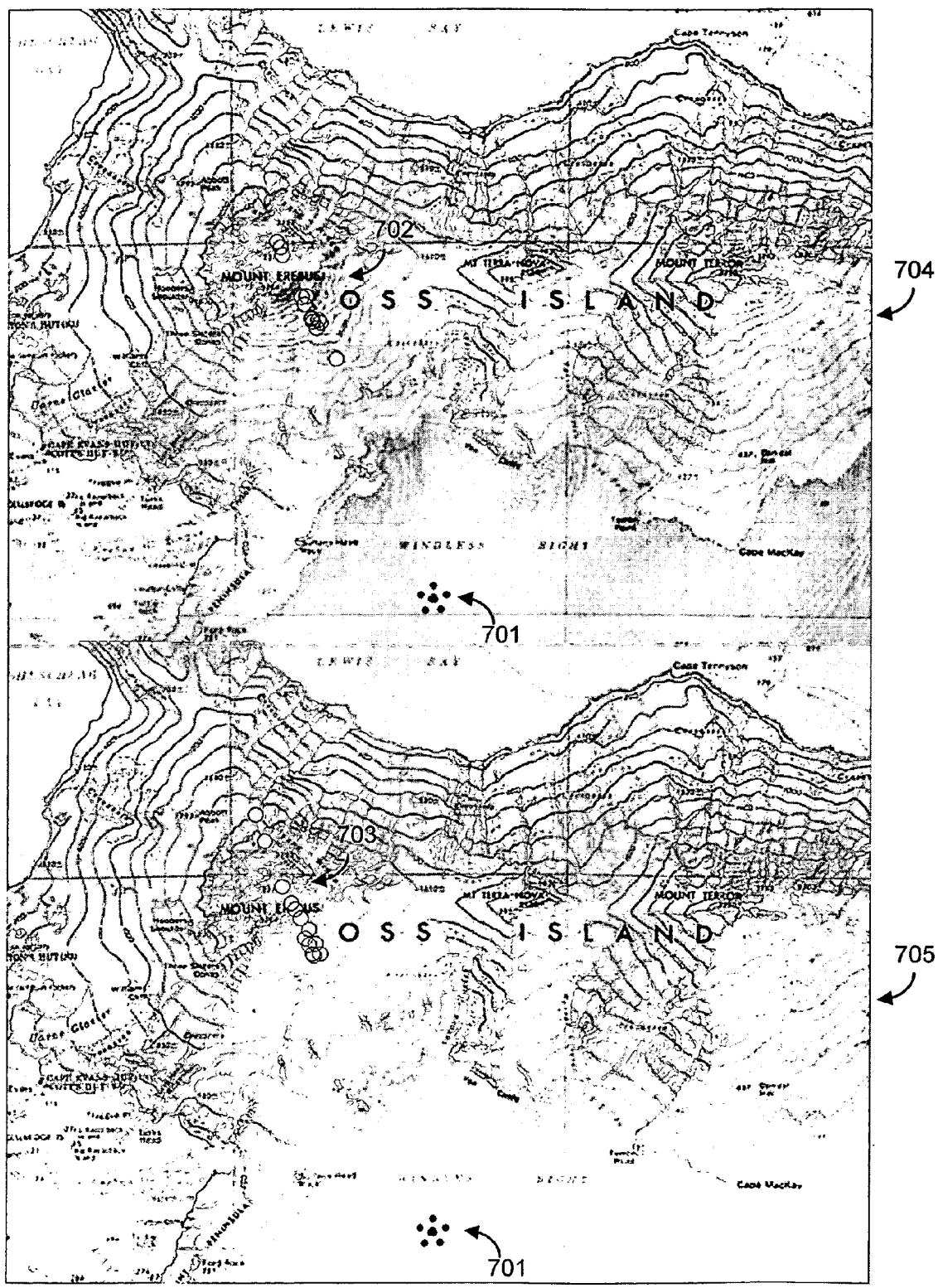
FIG. 7 displays the results of the invention (green dots) applied to Strombolian signals originating from Mt Erebus in Antarctica. The signals were detected by the 8 sensors of the I55US infrasound array (black dots) seen in the bottom center of both panels. Results are shown for both L1 norm based (upper panel) and L∞ norm based (lower panel) minimization procedures superimposed on a topographical map of the Ross Island.

Mt. Erebus, an active volcano on Antarctica's Ross Island commonly undergoes Strombolian eruptions. The movement of the lava column disturbs the air above it and produces infrasound signals detectable by the I55US infrasound array 701, comprised of eight sensors. FIG. 7 displays localization results 702 and 703 provided by the method as applied to these signals. The I55US infrasound array 701 and the localization results 702 and 703 are superimposed on a topographical map of Ross Island. Results are shown for both L1 norm based (upper panel 704) and L∞ norm based (lower panel 705) minimization procedures.

ii. Vee Cliff Ice Avalanches

Figure 8:
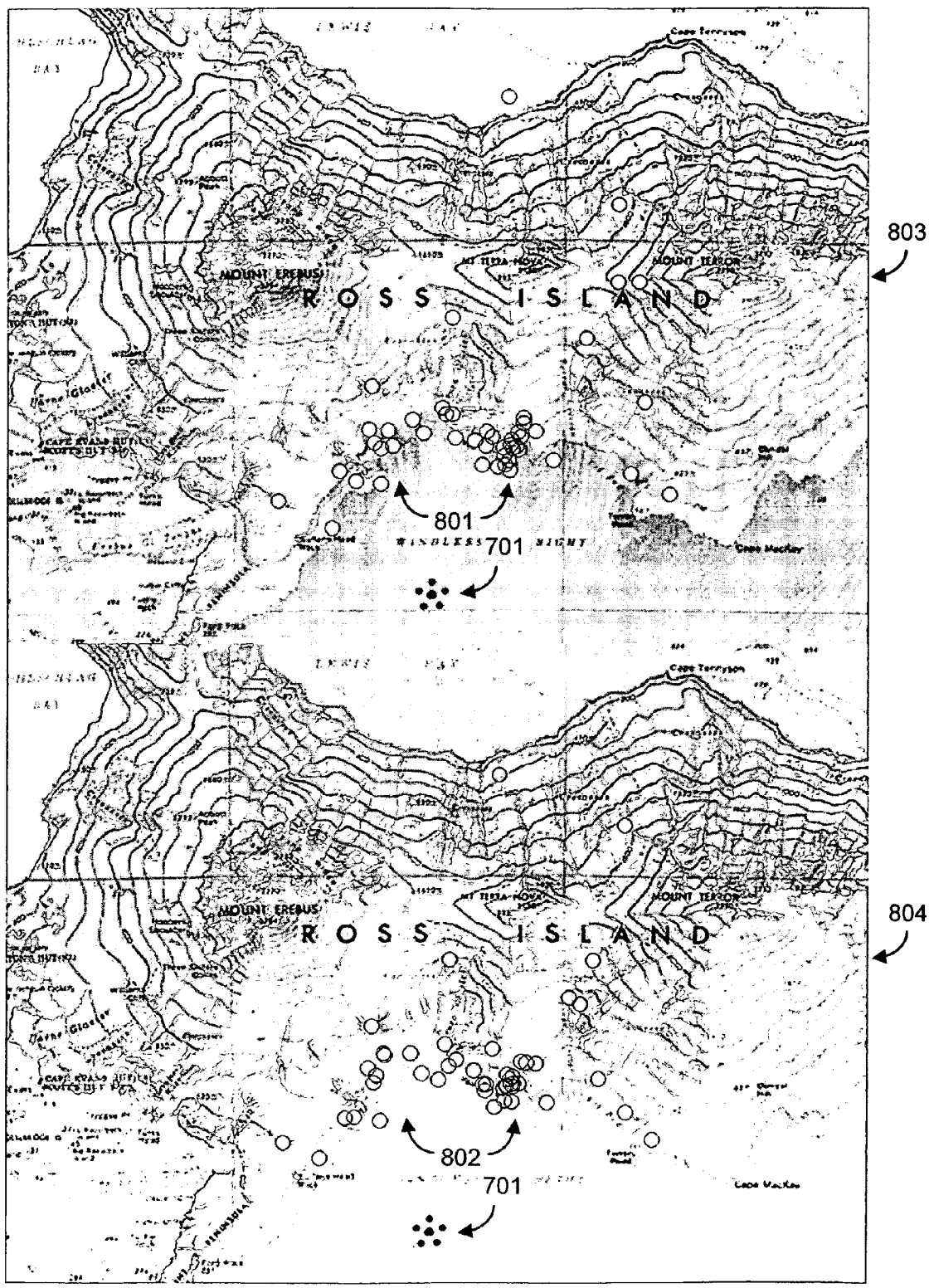
FIG. 8 displays the results of the invention (green dots) applied to several previously uncategorized signals detected by I55US from November 2002 to January 2003. By mapping the results, it became clear that these signals were primarily originating along the Southern coast of Ross Island, in particular the Vee Cliffs. Results are shown for both L1 norm based (upper panel) and L∞ norm based (lower panel) minimization procedures superimposed on a topographical map of the Ross Island.

The method was used with I55US in identifying sources and categorizing signals in Windless Bight, Antarctica. Many events in Windless Bight produce detectable infrasonic signals and are not well documented. As a result some of these signal sources are yet to be identified. However, the method disclosed, by providing the approximate position of local sources, can offer important clues to the identity of these sources. One such example is depicted in FIG. 8. Several uncategorized signals detected by I55US 701 from November 2002 to January 2003 were analyzed using the method disclosed. By mapping the results 801 and 802, it became clear that these signals were originating along the Southern coast of Ross Island, in particular the Vee Cliffs. These signals are due to movements and raptures in the ice sheet surrounding Ross Island and ice avalanched at the Vee Cliffs. In FIG. 8, results are shown for both L1 norm based (upper panel 803) and L∞ norm based (lower panel 804) minimization procedures superimposed on a topographical map of the Ross Island.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining a source location comprising:
   determining, for each sensor in a sensor array, times of source signal arrivals relative to each sensor;
   receiving, by the array, infrasonic signals;
   applying an analytical seed method to the relative source signal arrival times;
   building a simplex from the results of the analytical seed method; and determining a location; and
   determining a location using an optimization procedure.

2. The method of claim 1 wherein the analytical seed method comprises:
   redefining a location and a signal arrival time of a sensor as a new origin;
   determining signal speed; and
   determining a source location and source time.

3. The method of claim 1 wherein the optimization procedure is a Nelder-Mead optimization.

4. The method of claim 1 wherein the analytical seed method adjusts for constant known uniform motion of a medium.

5. The method of claim 1 wherein the analytical seed method adjusts for constant unknown uniform motion of a medium.

6. The method of claim 1 wherein the source is near the array.

7. The method of claim 1 wherein the source is within the array.

8. A method for determining a source location comprising:
   dividing a sensor array into at least one subarray;
   determining, for each subarray and for each sensor in each subarray, times of source signal arrivals relative to each sensor in the subarray;
   receiving, by the array, infrasonic signals;
   applying an analytical seed method to the source signal arrival times for each subarray;
   building a simplex from the results of the analytical seed method; and
   determining a location using an optimization procedure.

9. The method of claim 8 wherein the analytical seed method comprises:
   redefining a location and a signal arrival time of a sensor as a new origin;
   determining signal speed; and
   determining a source location and source time.

10. The method of claim 8 wherein the optimization procedure is a Nelder-Mead optimization.

11. The method of claim 8 wherein the analytical seed method adjusts for constant known uniform motion of a medium.

12. The method of claim 8 wherein the analytical seed method adjusts for constant unknown uniform motion of a medium.

13. The method of claim 8 wherein the source is near the array.

14. The method of claim 8 wherein the source is within the array.

15. A system for determining a source location comprising:
   a sensor array comprising at least four sensors;
   a computing device in communication with the sensor array wherein the computing device comprises:
   a memory element;
   a processor coupled to the memory element wherein the processor is configured to perform the steps of:
   receiving, by the sensor array, infrasonic signals;
   determining, for each sensor, times of source signal arrivals relative to each sensor in the sensor array;
   applying an analytical seed method to the relative source signal arrival times;
   building a simplex from the results of the analytical seed method; and
   determining a source location using an optimization procedure.

16. A computer readable medium with computer readable instructions embodied thereon for determining a source location comprising:
   determining, for each sensor, times of source signal arrivals relative to each sensor in a sensor array;
   receiving, by the sensor array, infrasonic signals;
   applying an analytical seed method to the relative source signal arrival times;
   building a simplex from the results of the analytical seed method; and
   determining a source location using an optimization procedure.

* * * * *